(12) United States Patent
Johnson et al.

(10) Patent No.: US 11,428,707 B2
(45) Date of Patent: Aug. 30, 2022

(54) AIR DATA PROBE WITH WELD SEALED INSERT

(71) Applicant: Rosemount Aerospace Inc., Burnsville, MN (US)

(72) Inventors: Paul Robert Johnson, Prior Lake, MN (US); Timothy Thomas Golly, Lakeville, MN (US); Greg Allen Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/441,892

(22) Filed: Jun. 14, 2019

(65) Prior Publication Data
US 2020/0393484 A1  Dec. 17, 2020

(51) Int. Cl.
| | | |
|---|---|---|
| *G01P 1/00* | (2006.01) | |
| *G01P 5/165* | (2006.01) | |
| *B33Y 80/00* | (2015.01) | |
| *B23K 1/00* | (2006.01) | |

(52) U.S. Cl.
CPC ............... *G01P 5/165* (2013.01); *G01P 1/00* (2013.01); *B23K 1/0008* (2013.01); *B33Y 80/00* (2014.12)

(58) Field of Classification Search
CPC . G01P 1/00; G01P 5/165; B33Y 80/00; B23K 1/0008
See application file for complete search history.

(56) References Cited

U.S. PATENT DOCUMENTS

| | | | |
|---|---|---|---|
| 2,254,155 A | 8/1941 | Reichel | |
| 2,343,282 A | 3/1944 | Daiber | |
| 2,381,327 A | 8/1945 | Woodman et al. | |
| 2,393,593 A | 1/1946 | Daiber | |
| 2,399,370 A | 4/1946 | McOrlly | |
| (Continued) | | | |

FOREIGN PATENT DOCUMENTS

| | | |
|---|---|---|
| CN | 2420633 Y | 2/2001 |
| CN | 102735888 A | 10/2012 |
| (Continued) | | |

OTHER PUBLICATIONS

Extended European Search Report for European Patent Application No. 19207424.3, dated Mar. 13, 2020, 8 pages.
(Continued)

*Primary Examiner* — Jamel E Williams
(74) *Attorney, Agent, or Firm* — Kinney & Lange, P.A.

(57) ABSTRACT

A probe head of an air data probe includes an insert, a portion of a heater, an outer shell, a tip weld, and a braze. The insert includes a first end, a second end opposite the first end, and a body portion extending between the first end and the second end. The body portion includes a groove. The portion of the heater is positioned within the groove. The outer shell surrounds the insert and the portion of the heater. The outer shell includes a tip portion defining a first end of the outer shell and a body portion extending from the tip portion defining a second end of the outer shell. The tip weld is between the outer shell and the first end of the insert, and the braze is between the insert and the second end of the outer shell adjacent a second end of the insert. The portion of the heater is hermetically sealed between the insert and the outer shell.

16 Claims, 17 Drawing Sheets

(56) References Cited

U.S. PATENT DOCUMENTS

| | | | |
|---|---|---|---|
| 2,428,542 A | 10/1947 | Bernhardt | |
| 2,601,331 A | 6/1952 | Segal | |
| 2,640,347 A | 6/1953 | Majeski | |
| 2,984,107 A | 5/1961 | Strieby et al. | |
| 2,987,565 A | 6/1961 | Barnhart et al. | |
| 3,138,025 A | 6/1964 | Fingerson | |
| 3,267,992 A | 8/1966 | Werner et al. | |
| 3,400,583 A | 9/1968 | Newport et al. | |
| 3,535,930 A | 10/1970 | Rees | |
| 3,590,460 A | 7/1971 | Highducheck et al. | |
| 3,885,613 A | 5/1975 | Evans | |
| 4,152,938 A | 5/1979 | Danninger | |
| 4,312,120 A | 1/1982 | Comer | |
| 4,615,213 A | 10/1986 | Hagan | |
| 4,836,019 A | 6/1989 | Hagen et al. | |
| 5,025,661 A | 6/1991 | McCormack | |
| 5,046,360 A | 9/1991 | Hedberg | |
| 5,062,869 A | 11/1991 | Hagen | |
| 5,099,686 A | 3/1992 | Koehler | |
| 5,130,707 A | 7/1992 | Hagen | |
| 5,220,319 A | 6/1993 | Kendel | |
| 5,228,563 A | 7/1993 | Stringham | |
| 5,232,086 A | 8/1993 | Montanari | |
| 5,392,622 A | 2/1995 | O'Donnell | |
| 5,423,209 A | 6/1995 | Nakaya et al. | |
| 5,458,008 A | 10/1995 | Rassatt | |
| 5,460,022 A | 10/1995 | Parsons | |
| 5,466,067 A | 11/1995 | Hagen et al. | |
| 5,487,291 A | 1/1996 | Voigt | |
| 5,495,942 A | 3/1996 | Izhak | |
| 5,543,183 A | 8/1996 | Streckert et al. | |
| 5,621,936 A | 4/1997 | Penaligon et al. | |
| 5,639,964 A * | 6/1997 | Djorup | G01P 5/00 73/170.12 |
| 5,653,538 A | 8/1997 | Phillips | |
| 5,731,507 A | 3/1998 | Hagen et al. | |
| 5,740,857 A | 4/1998 | Thompson et al. | |
| 6,062,869 A | 5/2000 | Mizobuchi et al. | |
| 6,070,475 A | 6/2000 | Muehlhauser et al. | |
| 6,079,845 A | 6/2000 | Kreider | |
| 6,237,756 B1 | 5/2001 | Caudle | |
| 6,323,420 B1 | 11/2001 | Head | |
| 6,371,286 B1 | 4/2002 | Montanari | |
| 6,419,186 B1 | 7/2002 | Bachinski et al. | |
| D463,989 S | 10/2002 | Bachinski et al. | |
| 6,550,344 B2 | 4/2003 | Bachinski et al. | |
| 6,591,696 B2 | 7/2003 | Bachinski | |
| 6,612,166 B2 | 9/2003 | Golly et al. | |
| 6,648,939 B2 | 11/2003 | Neuschwander et al. | |
| 6,740,857 B1 | 5/2004 | Furlong et al. | |
| 6,813,942 B1 | 11/2004 | Vozhdaev et al. | |
| 6,840,672 B2 | 1/2005 | Ice et al. | |
| 6,892,584 B2 | 5/2005 | Gilkison et al. | |
| 6,941,805 B2 | 9/2005 | Seidel et al. | |
| 7,370,526 B1 | 5/2008 | Ice | |
| 7,483,223 B2 | 1/2009 | Egle et al. | |
| 7,549,331 B1 | 6/2009 | Powell | |
| 7,597,018 B2 | 10/2009 | Braun et al. | |
| 7,705,275 B2 | 4/2010 | Umotoy et al. | |
| 7,716,980 B1 | 5/2010 | Colten et al. | |
| 7,915,567 B2 | 3/2011 | Lhuillier | |
| 7,937,977 B2 | 5/2011 | Booker | |
| 8,060,334 B1 | 11/2011 | Jarvinen | |
| 8,225,696 B2 | 7/2012 | Downes | |
| 8,341,989 B1 | 1/2013 | Hamblin et al. | |
| 8,365,591 B2 | 2/2013 | Golly | |
| 8,485,007 B2 | 7/2013 | Downes | |
| 8,718,955 B2 | 5/2014 | Golly et al. | |
| 8,857,255 B2 | 10/2014 | Anderson et al. | |
| 9,080,903 B2 * | 7/2015 | Ashton | G01F 1/46 |
| 9,207,253 B2 | 12/2015 | Seidel et al. | |
| 9,279,684 B2 | 3/2016 | Marty et al. | |
| 9,366,555 B2 * | 6/2016 | Schober | G01P 5/14 |
| 9,541,429 B2 | 1/2017 | Farokhi et al. | |
| 9,664,542 B2 | 5/2017 | Gordon et al. | |
| 9,719,820 B1 | 8/2017 | Jacob et al. | |
| 9,722,345 B2 | 8/2017 | Arnesson et al. | |
| 9,772,345 B2 | 9/2017 | Golly et al. | |
| 9,791,304 B2 | 10/2017 | Wong et al. | |
| 9,856,027 B2 | 1/2018 | Anderson et al. | |
| 9,891,083 B2 * | 2/2018 | Gordon | G01F 1/46 |
| 9,918,524 B2 | 3/2018 | Byrd et al. | |
| 9,976,882 B2 | 5/2018 | Seidel et al. | |
| 10,024,877 B2 | 7/2018 | Golly et al. | |
| 10,040,570 B2 * | 8/2018 | Heuer | B64D 43/00 |
| 10,227,139 B2 | 3/2019 | Golly et al. | |
| 10,234,475 B2 | 3/2019 | Sarno et al. | |
| 10,281,303 B2 | 5/2019 | Johnson et al. | |
| 10,384,787 B2 | 8/2019 | Gordon et al. | |
| 10,605,637 B2 | 3/2020 | Gordon et al. | |
| 10,613,112 B2 * | 4/2020 | Golly | G01P 5/165 |
| 10,884,014 B2 | 1/2021 | Golly et al. | |
| 10,955,433 B2 | 3/2021 | Jacob et al. | |
| 11,167,861 B2 | 11/2021 | Golly et al. | |
| 2004/0085211 A1 | 5/2004 | Gotfried | |
| 2004/0093953 A1 * | 5/2004 | Gilkison | G01P 5/165 73/736 |
| 2004/0177683 A1 | 9/2004 | Ice | |
| 2004/0244477 A1 | 12/2004 | Zippold et al. | |
| 2005/0011285 A1 | 1/2005 | Giterman | |
| 2005/0179542 A1 | 8/2005 | Young | |
| 2006/0144007 A1 | 7/2006 | Azarin | |
| 2006/0207753 A1 | 9/2006 | Sanatgar et al. | |
| 2007/0079639 A1 | 4/2007 | Hsu | |
| 2010/0000885 A1 | 1/2010 | Downes | |
| 2010/0123549 A1 | 5/2010 | Lickfelt et al. | |
| 2011/0036160 A1 | 2/2011 | Pineau et al. | |
| 2012/0280498 A1 | 11/2012 | Irwin et al. | |
| 2013/0014586 A1 | 1/2013 | Walling et al. | |
| 2013/0145862 A1 | 6/2013 | Leblond et al. | |
| 2014/0053644 A1 | 2/2014 | Anderson et al. | |
| 2014/0156226 A1 | 6/2014 | Hashemian et al. | |
| 2014/0332192 A1 | 11/2014 | Cosby, II et al. | |
| 2015/0356393 A1 | 12/2015 | Daoura et al. | |
| 2016/0091355 A1 | 3/2016 | Mesnard et al. | |
| 2016/0280391 A1 | 9/2016 | Golly et al. | |
| 2017/0052046 A1 | 2/2017 | Gordon et al. | |
| 2017/0086656 A1 | 3/2017 | Hiratsuka | |
| 2017/0092030 A1 | 3/2017 | Badger, II | |
| 2017/0108360 A1 * | 4/2017 | Wong | G01D 11/30 |
| 2017/0110838 A1 | 4/2017 | Sasaki | |
| 2017/0115139 A1 | 4/2017 | Wong et al. | |
| 2017/0169974 A1 | 6/2017 | Miyakawa et al. | |
| 2017/0199063 A1 | 7/2017 | Gordon et al. | |
| 2017/0256340 A1 * | 9/2017 | dos Santos e Lucato | E21B 43/01 |
| 2017/0369175 A1 * | 12/2017 | Gordon | G01P 5/165 |
| 2018/0128849 A1 | 5/2018 | Wong et al. | |
| 2018/0175518 A1 | 6/2018 | Mori et al. | |
| 2018/0209863 A1 | 7/2018 | Golly et al. | |
| 2018/0259547 A1 | 9/2018 | Abdullah et al. | |
| 2018/0259548 A1 * | 9/2018 | Anderson | G01P 5/165 |
| 2019/0186974 A1 * | 6/2019 | Golly | G01P 13/025 |
| 2019/0234986 A1 | 8/2019 | Ortelt | |
| 2019/0383848 A1 | 12/2019 | Matheis et al. | |
| 2020/0109982 A1 | 4/2020 | Jacob et al. | |
| 2020/0114428 A1 | 4/2020 | Golly et al. | |
| 2020/0123650 A1 | 4/2020 | Poteet et al. | |
| 2020/0141964 A1 | 5/2020 | Marty et al. | |
| 2020/0233007 A1 | 7/2020 | Jacob et al. | |
| 2020/0309808 A1 | 10/2020 | Golly et al. | |
| 2021/0022215 A1 | 1/2021 | Jacob et al. | |
| 2021/0048322 A1 | 2/2021 | Poteet et al. | |
| 2021/0055143 A1 | 2/2021 | Wigen et al. | |
| 2021/0127458 A1 | 4/2021 | Jacob et al. | |
| 2021/0140989 A1 | 5/2021 | Buenz et al. | |
| 2022/0024602 A1 | 1/2022 | Golly et al. | |

FOREIGN PATENT DOCUMENTS

| | | |
|---|---|---|
| EP | 0737315 A1 | 10/1996 |
| EP | 3073275 A2 | 9/2016 |
| EP | 3076185 A1 | 10/2016 |
| EP | 3133403 A1 | 2/2017 |

(56) References Cited

FOREIGN PATENT DOCUMENTS

| EP | 3159700 | A1 | 4/2017 | | |
|---|---|---|---|---|---|
| EP | 3214704 | A1 | 9/2017 | | |
| EP | 3499217 | A2 | 6/2019 | | |
| EP | 3499217 | A2 * | 6/2019 | ............. | G01F 15/14 |
| GB | 562880 | | 7/1944 | | |
| GB | 1118794 | | 7/1968 | | |
| WO | WO9613727 | A1 | 5/1996 | | |
| WO | WO9816837 | A1 | 4/1998 | | |
| WO | WO0111582 | A1 | 2/2001 | | |
| WO | WO0167115 | A2 | 9/2001 | | |
| WO | WO0177622 | A2 | 10/2001 | | |

OTHER PUBLICATIONS

Bifilar Coil, Wikipedia, as captured by the Internet Archive on Aug. 2, 2015, 3 pages.
Extended European Search Report for European Patent Application No. 18207317.1, dated May 24, 2019, 7 pages.
Extended European Search Report for European Patent Application No. 19213580.4, dated Jun. 26, 2020, 13 pages.
Extended European Search Report for European Patent Application No. 19215840.0, dated Jul. 3, 2020, 14 pages.

\* cited by examiner

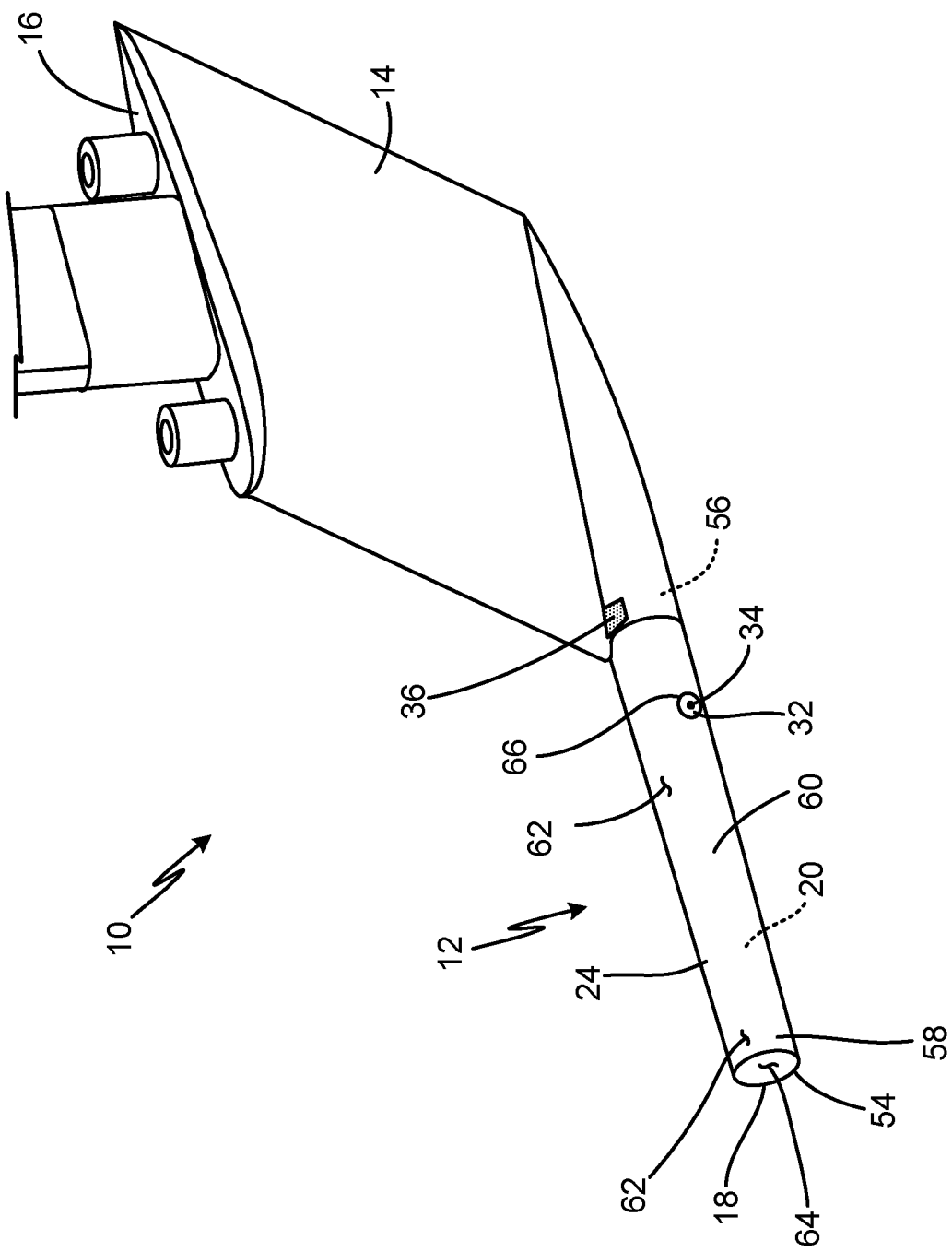

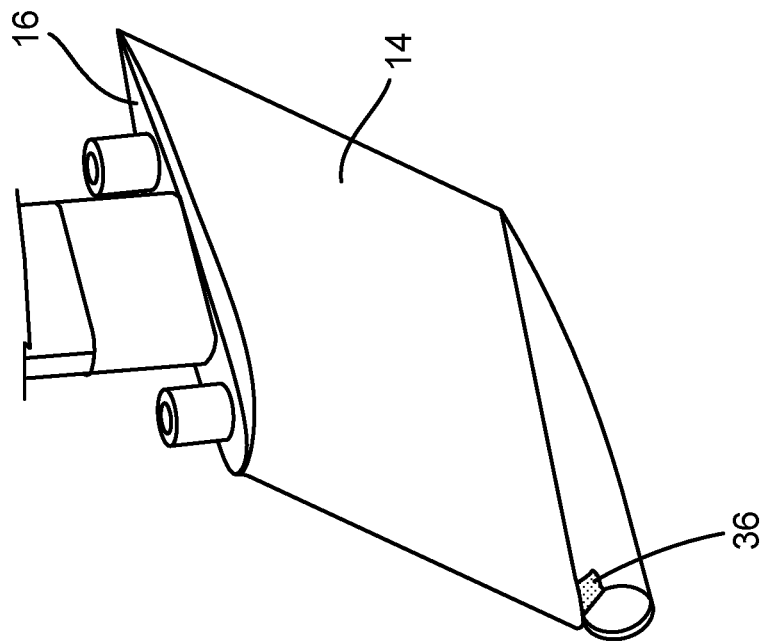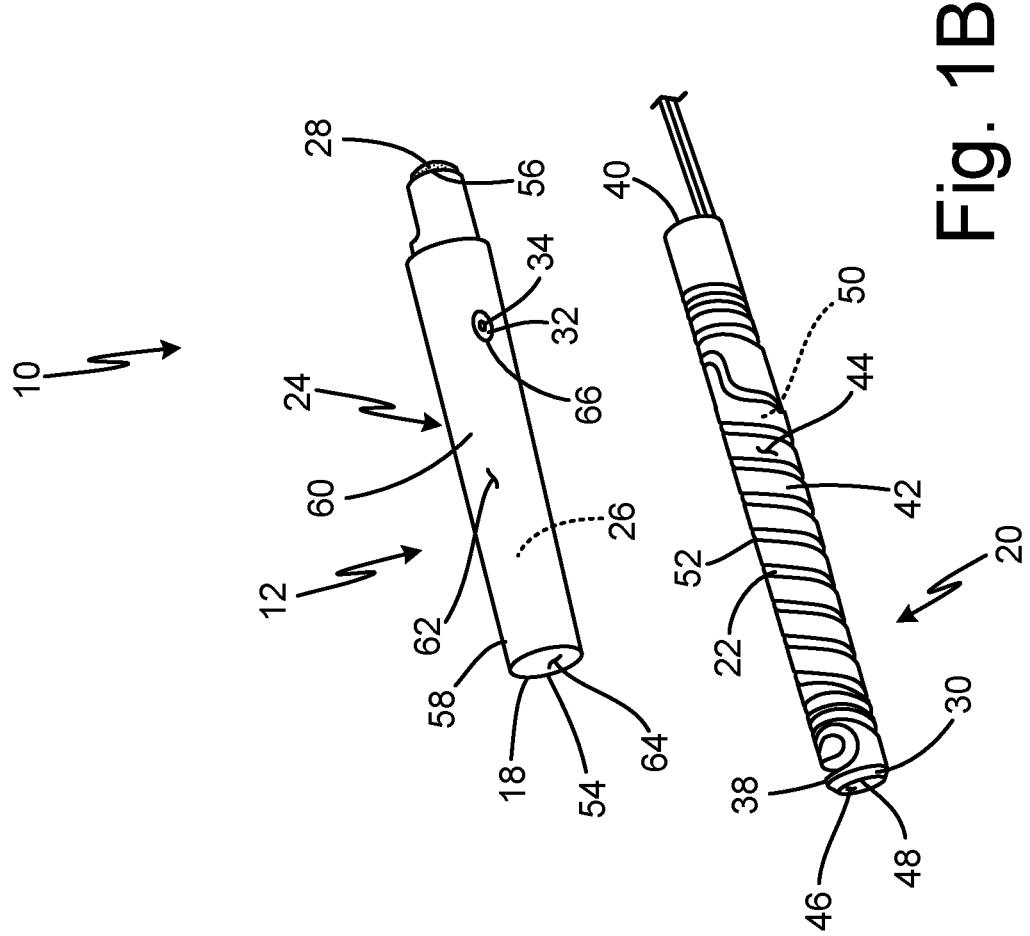
Fig. 1B

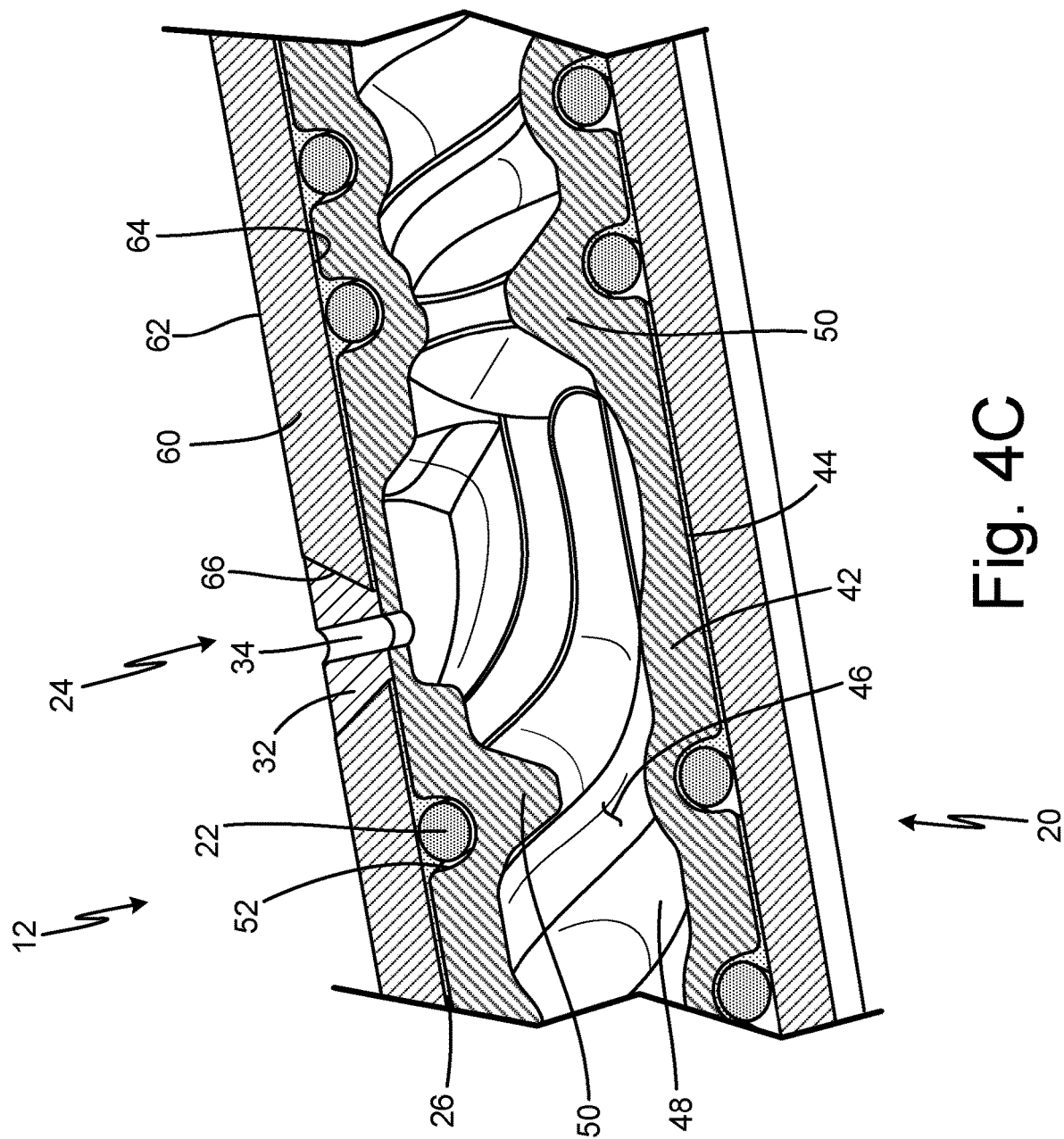

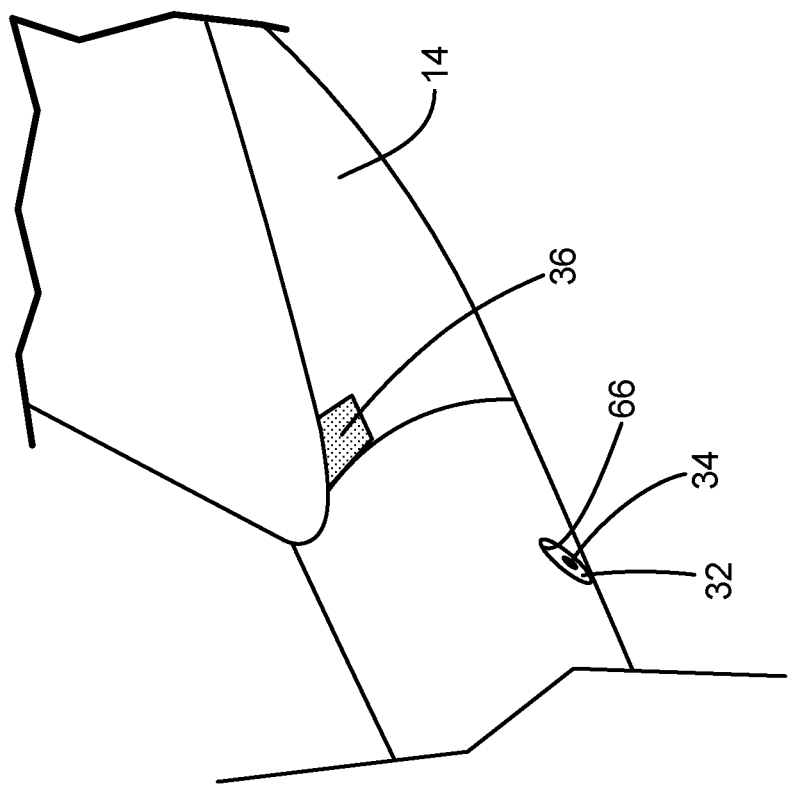

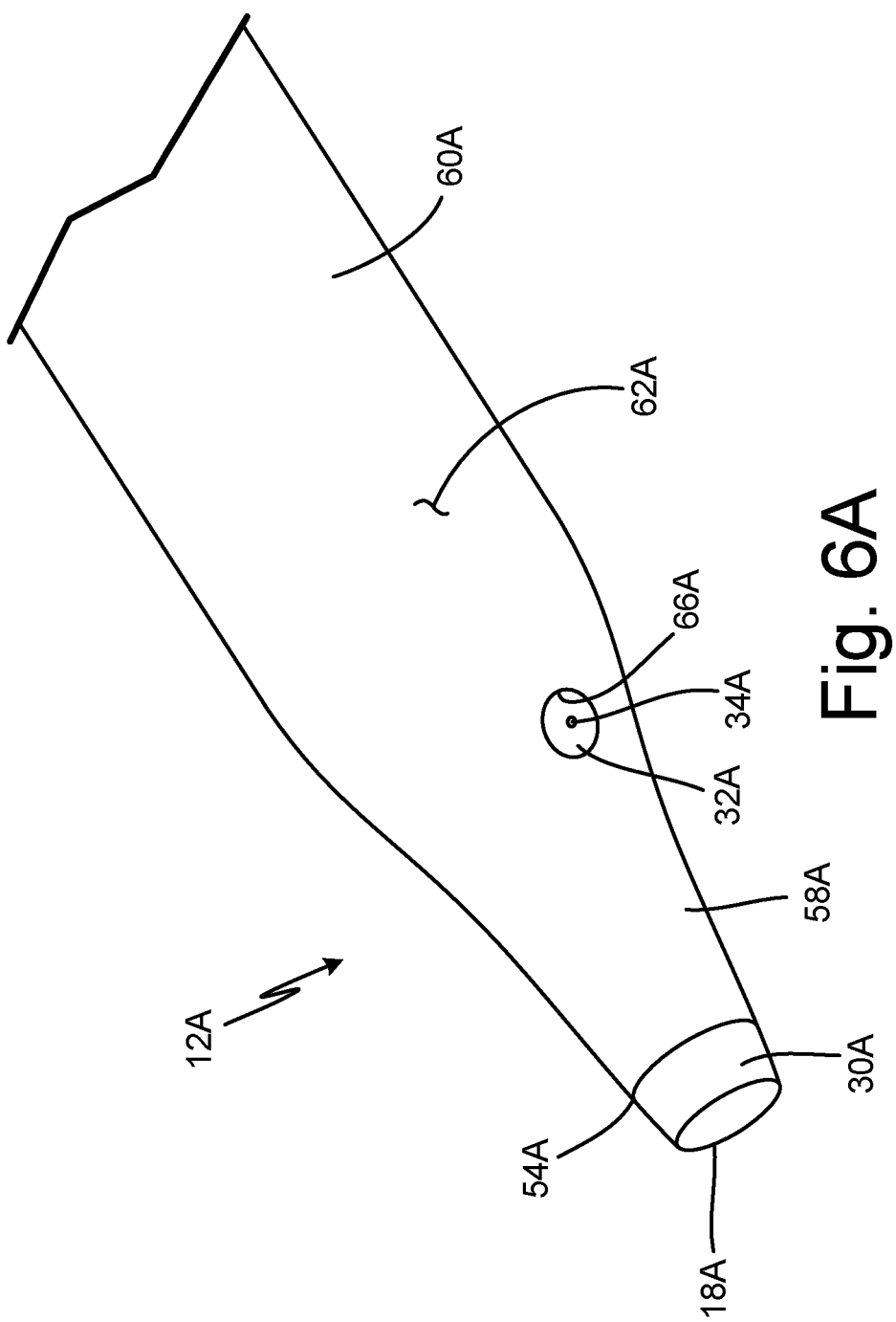

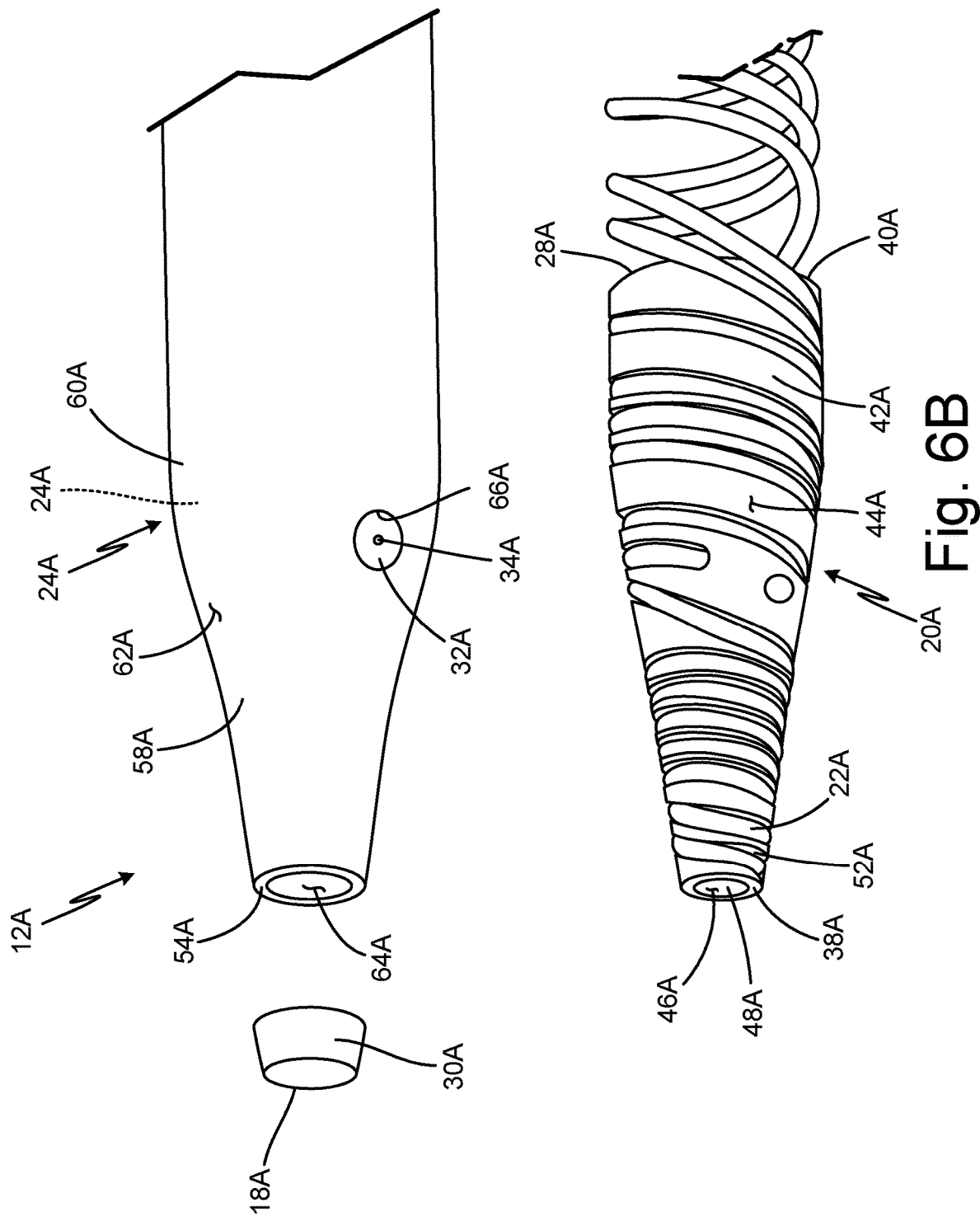

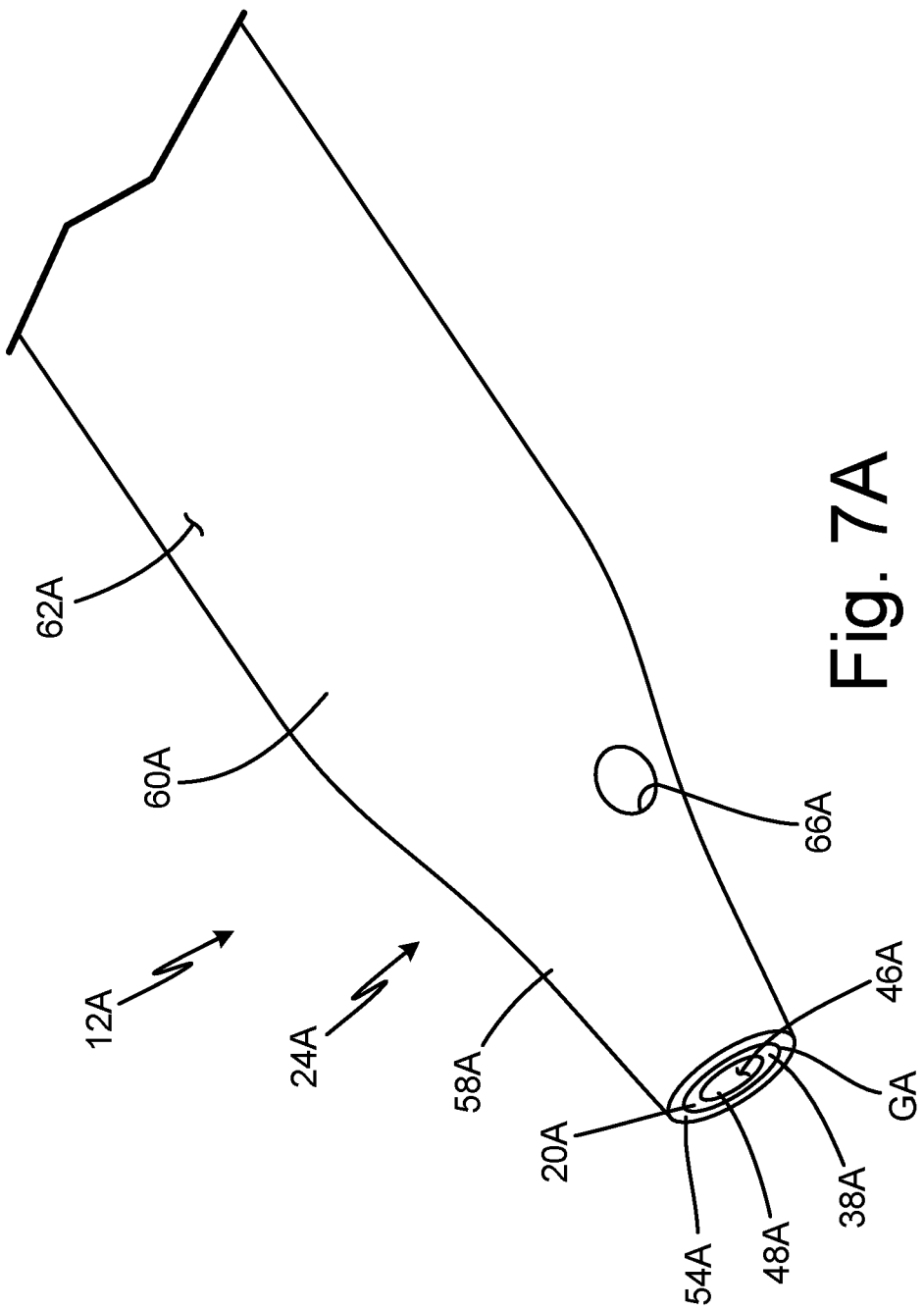

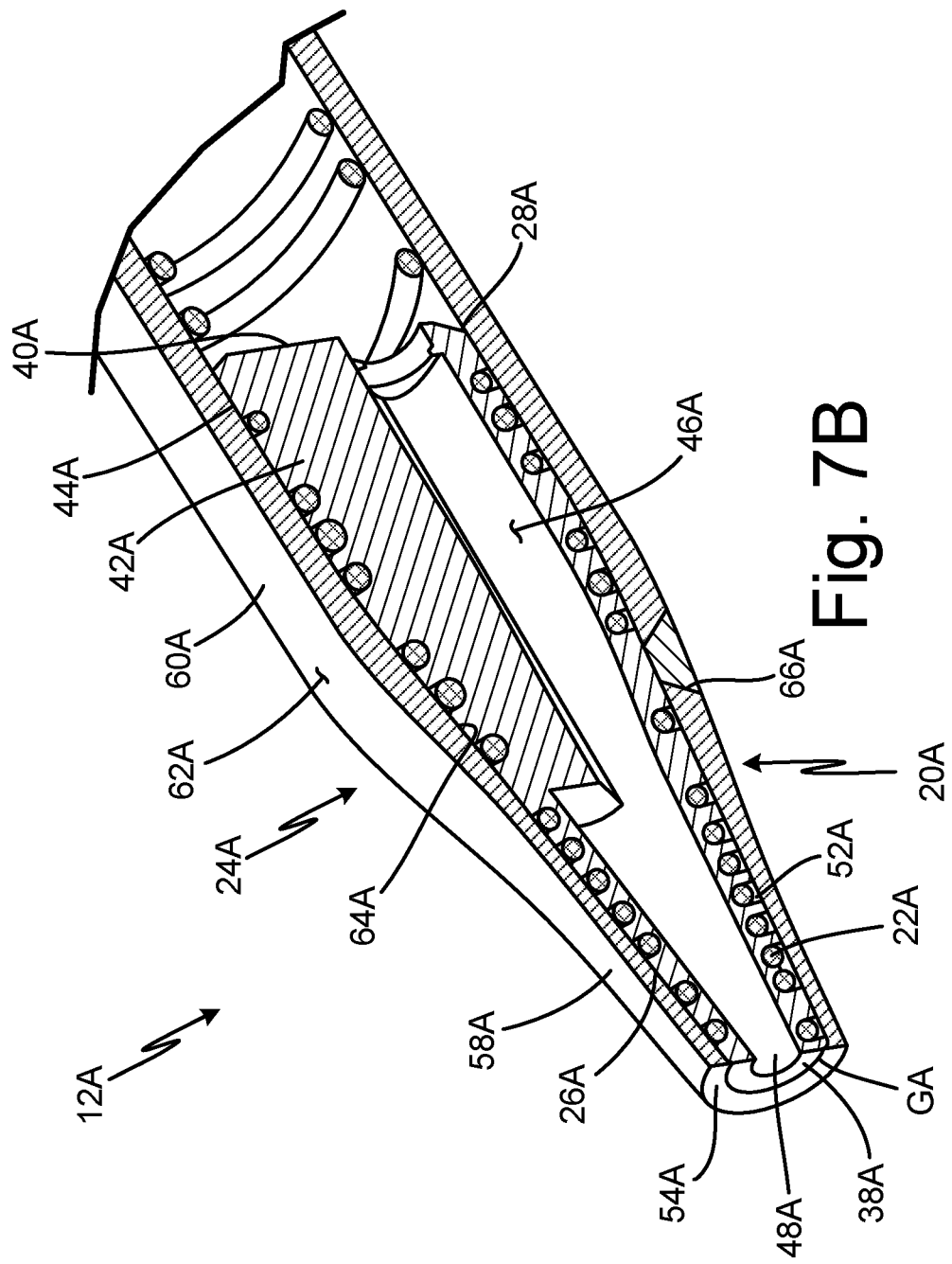

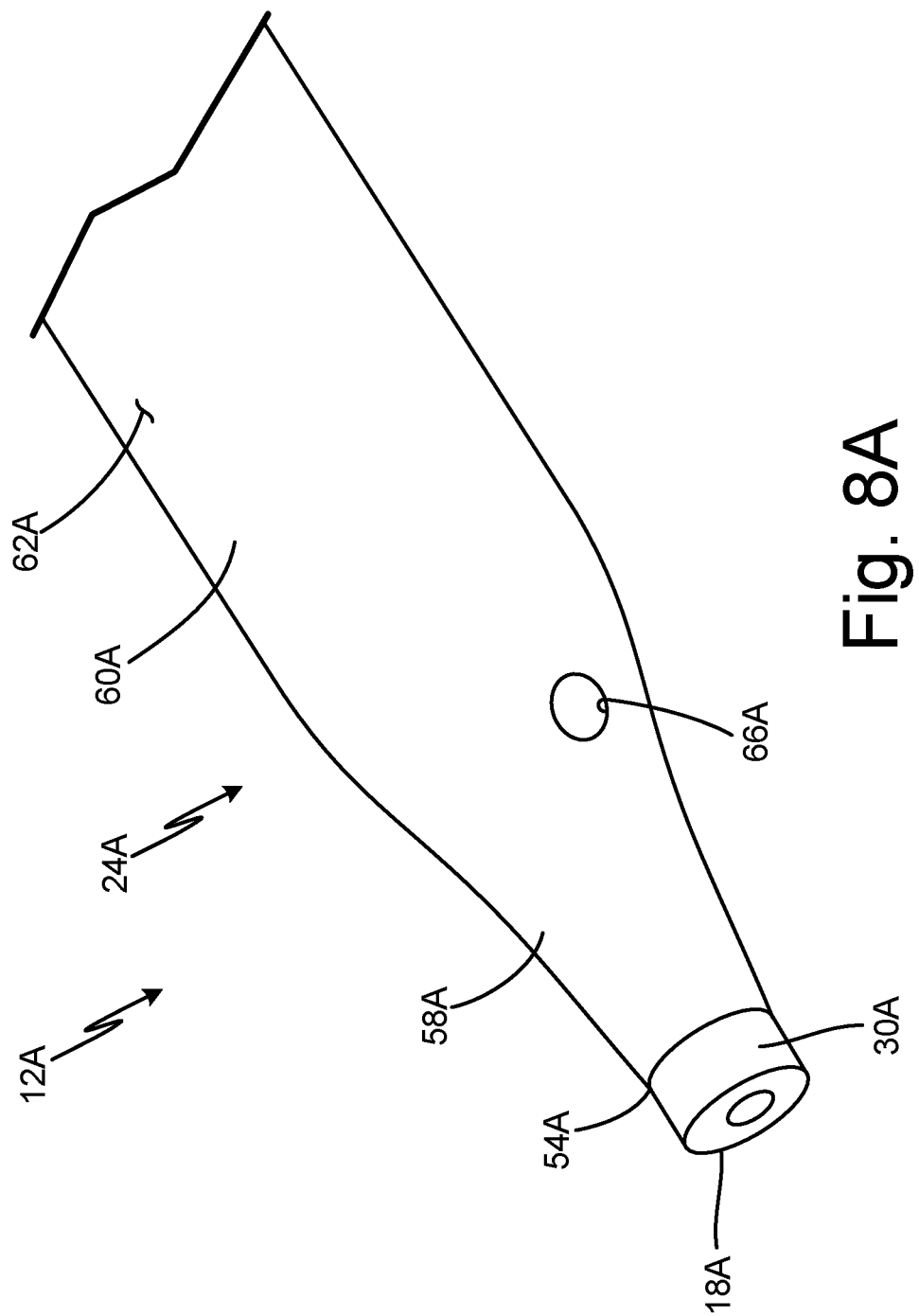

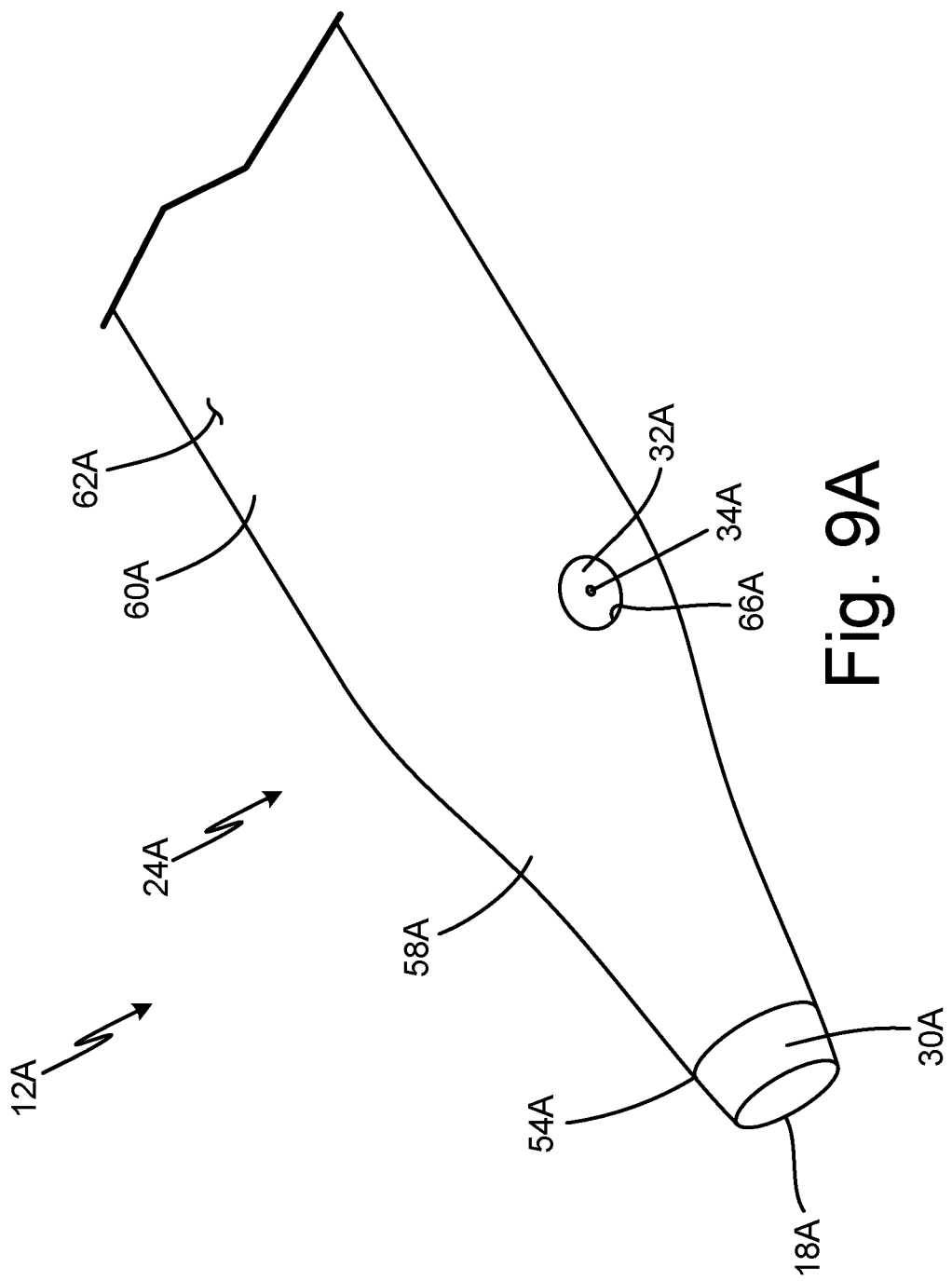

AIR DATA PROBE WITH WELD SEALED INSERT

BACKGROUND

The present disclosure relates to air data probes, and in particular, to probe heads of air data probes.

Air data probes, such as pitot probes, are installed on aircraft to measure air data parameters. Pitot probes are exposed to the environmental conditions exterior to the aircraft, which are often cold. As such, heaters are positioned within pitot probes to ensure the pitot probes function properly in rain and icing environments. The heater is generally connected to the probe head of the pitot probe. Heaters are susceptible to failure caused by corrosion due to environmental contamination.

SUMMARY

A probe head of an air data probe comprises an insert, a portion of a heater, an outer shell, a tip weld, and a braze. The insert includes a first end, a second end opposite the first end, and a body portion extending between the first end and the second end. The body portion includes a groove. The portion of the heater is positioned within the groove. The outer shell surrounds the insert and the portion of the heater. The outer shell includes a tip portion defining a first end of the outer shell and a body portion extending from the tip portion defining a second end of the outer shell. The tip weld is between the outer shell and the first end of the insert, and the braze is between the insert and the second end of the outer shell adjacent a second end of the insert. The portion of the heater is hermetically sealed between the insert and the outer shell.

A probe head of an air data probe includes an insert, a portion of a heater, an outer shell, and a tip weld. The insert includes a first end, a second end opposite the first end, and a body portion extending between the first end and the second end. The body portion includes a groove. The portion of the heater is positioned within the groove. The outer shell surrounds the insert and the portion of the heater. The outer shell includes a tip portion defining a first end of the outer shell and a body portion extending from the tip portion. The tip weld is connected to the first end of the insert and the first end of the outer shell.

A method of forming a probe head includes inserting an insert with a portion of a heater into an outer shell of the probe head, brazing the outer shell to the insert and the portion of the heater, welding a gap between the outer shell and a first end of the insert, the first end of the insert opposite the second end of the insert, the second end being configured to be attached to a strut, brazing an end of the outer shell to the insert adjacent a second end of the insert, and sealing the first end of the insert to the outer shell.

BRIEF DESCRIPTION OF THE DRAWINGS

FIG. 1A is a perspective view of an air data probe.
FIG. 1B is a partial exploded view of the air data probe.

FIG. 4C is a partial cross-sectional view of the hole in the probe head.
FIG. 5B is a partial perspective view of the probe head assembled to the strut and including braze.
FIG. 6A is a partial perspective view of a second embodiment of a probe head.
FIG. 6B is a partial exploded view of the second embodiment of the probe head of FIG. 6A.
FIG. 7A is a partial perspective view of an insert inside an outer shell of the probe head of FIG. 6.
FIG. 7B is a partial cross-sectional view of the insert inside the outer shell of the probe head of FIG. 6.
FIG. 8A is a partial perspective view of the outer shell with a tip weld.
FIG. 9A is a partial perspective view of the probe head showing a hole through a weld in the probe head and after machining.

DETAILED DESCRIPTION

Figure 2:
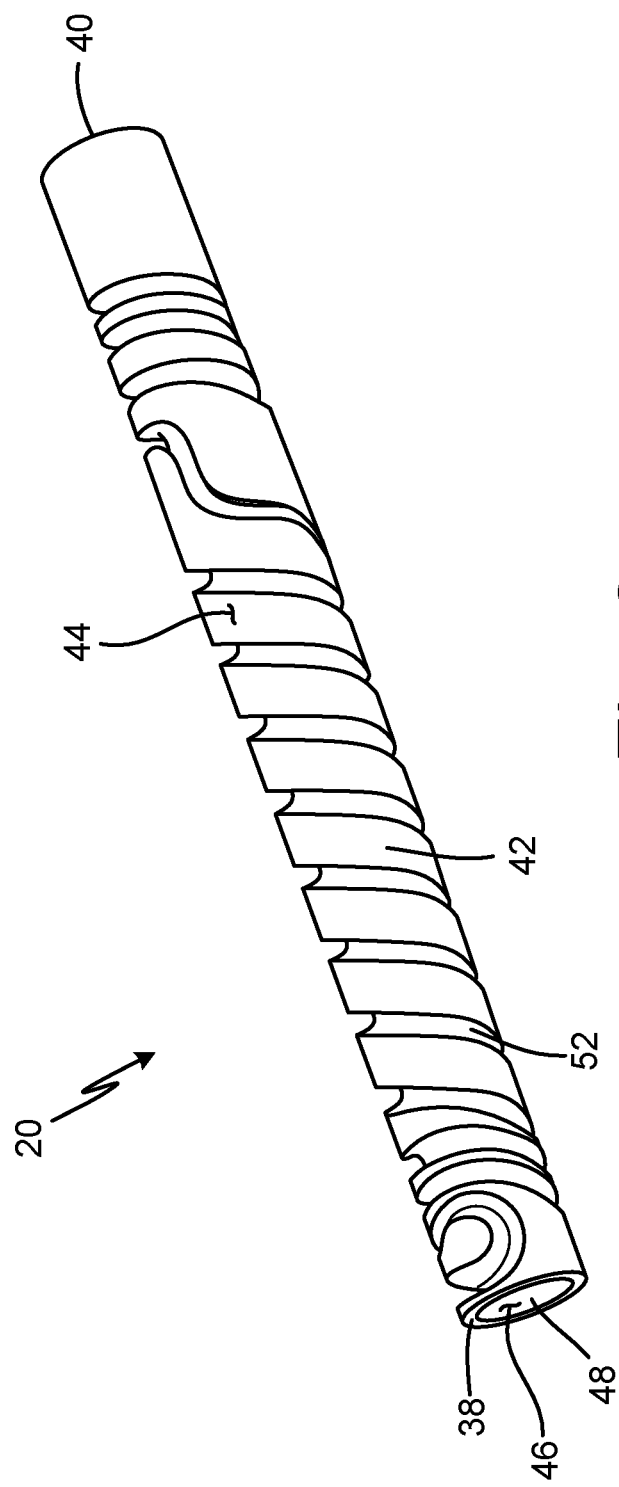
FIG. 2 is a perspective view of an insert of a probe head of the air data probe.

In general, the present disclosure describes a probe head of an air data probe (such as a pitot probe or a pitot-static probe) that has an end of an insert sealed to an outer shell via a tip weld, either at an interior surface of the outer shell or at a first end of the outer shell such that the tip weld makes up the tip of the air data probe. As a result, the first end of the insert is sealed to the outer shell via the tip weld, sealing leak paths to prevent the heater from being directly exposed to moisture or external contaminants, improve heat transfer within the probe head, and reduce corrosion.

FIG. 1A is a perspective view of air data probe 10. FIG. 1B is a partial exploded view of air data probe 10. FIGS. 1A and 1B will be discussed together to describe the components of air data probe 10. Air data probe 10 includes probe head 12, strut 14, and mounting flange 16. Probe head 12 includes tip 18, insert 20, heater 22 (shown in FIG. 1B), outer shell 24, first braze 26 (shown in FIG. 1B), second braze 28 (shown in FIG. 1B), tip weld 30 (shown in FIG. 1B), hole weld 32, hole 34, and third braze 36. Insert 20 includes first end 38 (shown in FIG. 1B), second end 40 (shown in FIG. 1B), body portion 42 (shown in FIG. 1B), exterior surface 44 (shown in FIG. 1B), interior surface 46 (shown in FIG. 1B), bore 48 (shown in FIG. 1B), water dams 50 (shown in FIG. 1B), and groove 52 (shown in FIG. 1B). Outer shell 24 includes first end 54, second end 56, tip portion 58, body portion 60, exterior surface 62, interior surface 64, and hole 66.

In this embodiment, air data probe 10 is a pitot probe. In alternate embodiments, air data probe 10 may be any other suitable air data probe, including, for example, a pitot-static probe. Probe head 12 is hollow and substantially cylindrical. Internal components of air data probe 10 are located within probe head 12. Probe head 12 is the sensing head of air data probe 10. Probe head 12 is connected to a first end of strut 14. A second end of strut 14 is connected to mounting flange 16. As such, strut 14 connects probe head 12 to mounting flange 16. Strut 14 is blade-shaped. Internal components of air data probe 10 are located within strut 14. Mounting flange 16 makes up a mount of air data probe 10. Mounting flange 16 may include mounting holes and is connectable to an aircraft.

Tip 18 of probe head 12 is at an end of probe head 12 opposite the end of probe head 12 connected to strut 14. Insert 20 supports heater 22 and is surrounded by outer shell 24, which forms tip 18. Insert 20 is hollow and substantially cylindrical. Insert 20 may be additively manufactured. Heater 22 is wire-like and is helically wound around insert 20. Outer shell 24 is substantially cylindrical and fully surrounds insert 20 and a portion of heater 22 such that the portion of heater 22 in probe head 12 is between insert 20 and outer shell 24. Outer shell 24 is connected to insert 20 and heater 22 via first braze 26. As such, first braze 26 is between insert 20 with heater 22 and outer shell 24. First braze 26 is adequate for heat transfer but may be incomplete with voids or other defects. Second braze 28 connects and hermetically seals an end of insert 20 and an end of outer shell 24. Tip weld 30 is at an interior surface of outer shell 24 and connects outer shell 24 and an end of insert 20. As such, tip weld 30 is between the end of insert 20 and outer shell 24 to connect and seal insert 20 and outer shell 24 near tip 18. Hole weld 32 is a weld extending through and filling a hole in outer shell 24. Hole weld 32 extends to insert 20. Hole 34 is a hole that extends through outer shell 24 at hole weld 32 and through insert 20. Hole 34 may be a drain hole, a sensing port such as a static port, an angle of attack port, or an alpha port, or any other suitable hole. Probe head 12 may have one hole 34, two holes 34, or any other suitable number of holes 34. Hole 34 is hermetically sealed from heater 22. Third braze 36 connects and seals insert 20, second braze 28, and outer shell 24 to strut 14.

Insert 20 has first end 38 at one end of insert 20 and second end 40 at the other end of insert 20 opposite first end 38. First end 38 is connected to outer shell 24 via tip weld 30. Second end 40 is connected and hermetically sealed to outer shell 24 via second braze 28. Body portion 42 of insert 20 extends from first end 38 to second end 40. Exterior surface 44 is an outer surface of insert 20 and extends from first end 38 to second end 40. Interior surface 46 is an inner surface of insert 20 and extends from first end 38 to second end 40. Interior surface 46 may be smooth, conform to heater 22, or have any other suitable shape or texture. Interior surface 46 defines bore 48. Bore 48 is an opening of probe head 12 that extends from first end 38 to second end 40 within insert 20. Interior surface 46 also defines water dams 50, which are integral to insert 20. Water dams 50 may be near holes 34. Groove 52 extends into exterior surface 44 of insert 20. Groove 52 winds along insert 20 between first end 38 and second end 40 across body portion 42. Groove 52 is helical at body portion 42. A portion of heater 22 is positioned within groove 52. As a result, the portion of heater 22 within probe head 12 is helical.

Outer shell 24 has first end 54 at one end of outer shell 24 and second end 56 at the other end of outer shell 24 opposite first end 54. Outer shell 24 surrounds insert 20 such that first end 54 of outer shell 24 extends beyond first end 38 of insert 20 and second end 40 of insert 20 extends beyond second end 56 of outer shell. Tip portion 58 defines and extends from first end 54. As such, tip portion 58 extends beyond first end 38 of insert 20. Tip portion 58 makes up tip 18 of probe head 12. Body portion 60 extends from an end of tip portion 58 to second end 56 and defines second end 56. As such, tip portion 58 and body portion 60 make up outer shell 24. Body portion 60 surrounds insert 20 and the portion of heater 22 within probe head 12. Exterior surface 62 is an outer surface of outer shell 24 and extends from first end 54 to second end 56. Interior surface 64 is an inner surface of outer shell 24 and extends from first end 54 to second end 56. Interior surface 64 forms an inner diameter of outer shell 24 having a varied diameter at tip portion 58 and a substantially constant diameter at body portion 60. Hole 66 extends through outer shell 24 from exterior surface 62 to an interior surface 64.

First braze 26 extends from first end 38 of insert 20 to second end 56 of outer shell 24 and along body portion 42 of insert 20. First braze 26 is between exterior surface 44 of insert 20 and interior surface 64 of outer shell 24. Tip weld 30 is between first end 38 of insert 20 and interior surface 64 of outer shell 24 at an end of tip portion 58 adjacent body portion 60. Tip weld 30 fills gap G between first end 38 of insert 20 and interior surface 64 of tip portion 58 of outer shell 24, formed by the variation in the inner diameter of outer shell 24 at tip portion 58. Tip weld 30 connects and seals first end 38 of insert 20 and interior surface 64 of outer shell 24. Body portion 42 of insert 20 near second end 40 of insert 20 and second end 56 of outer shell 24 are connected via second braze 28. As such, second braze 28 is between insert 20 adjacent second end 40 of insert and second end 56 of outer shell 24. Second end 40 of insert 20, second braze 28, and second end 56 of outer shell 24 are connected to strut 14 via third braze 36. Hole weld 32 fills hole 66 in outer shell 24 and extends to exterior surface 44 of insert 20 at body portion 42. As such, hole weld 32 extends from exterior surface 62 of outer shell 24 to interior surface 64 of outer shell 24 and exterior surface 44 of insert 20. Hole 34 extends into bore 48 through outer shell 24 at hole weld 32 in hole 66 and through insert 20 such that hole 34 provides fluidic communication between bore 48 and an outside of outer shell 24 while being hermetically sealed from heater 22. As such, heater 22 within probe head 12 is fully encapsulated and hermetically sealed between insert 20 and outer shell 24.

Pitot probe 10 is installed on an aircraft. Pitot probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air at tip 18 from surrounding external airflow. Air pressures from probe head 12 are communicated pneumatically through bore 48 of insert 20 in probe head 12 and internal components and passages of strut 14. Pressure measurements are communicated to a flight computer and can be used to generate air data parameters related to the aircraft flight condition.

Heater 22 transmits heat to outer shell 24 of probe head 12 to prevent ice accumulation on pitot probe 10, which can interfere with the functionality of pitot probe 10. Tip weld 30 at first end 38 of insert 20 and interior surface 64 of outer shell 24 seals first end 38 of insert while second braze 28 provides a seal at second end 56 of outer shell 24, fully encapsulating and hermetically sealing heater 22 between insert 20 and outer shell 24. Water dams 50 redirect, or knock down, water particles in the airflow moving through bore 48. Hole 34 extending through probe head 12 at hole weld 32 ensures that probe head 12 can include hole 34, such as a drain hole for water to exit bore 48, while maintaining a hermetic seal between heater 22 within probe head 12 and the external environment.

Typically, pitot probes are exposed to environmental contamination from the external environment, such as water, salts, acids, or other industrial contaminants, which can lead to loss of functionality or corrosion of the heater. For example, the heater can rapidly fail as a result of corrosion, necessitating replacement of the probe. In probes without inserts, the exterior sheath of the heater is normally exposed to environmental contamination.

Because first end 38 of insert 20 is sealed to interior surface 64 of outer shell 24, leak paths near first end 38 are sealed, preventing heater 22 from being directly exposed to moisture or other external contaminants, reducing corrosion, and improving heat transfer within probe head 12. Further, because second end 56 of outer shell 24 is also sealed to insert 20, an entirety of heater 22 within probe head 12 is sealed between insert 20 and outer shell 24, further protecting heater 22 from the external environment by preventing direct exposure of heater 22 to moisture or other contamination that could induce corrosion.

Figure 3:
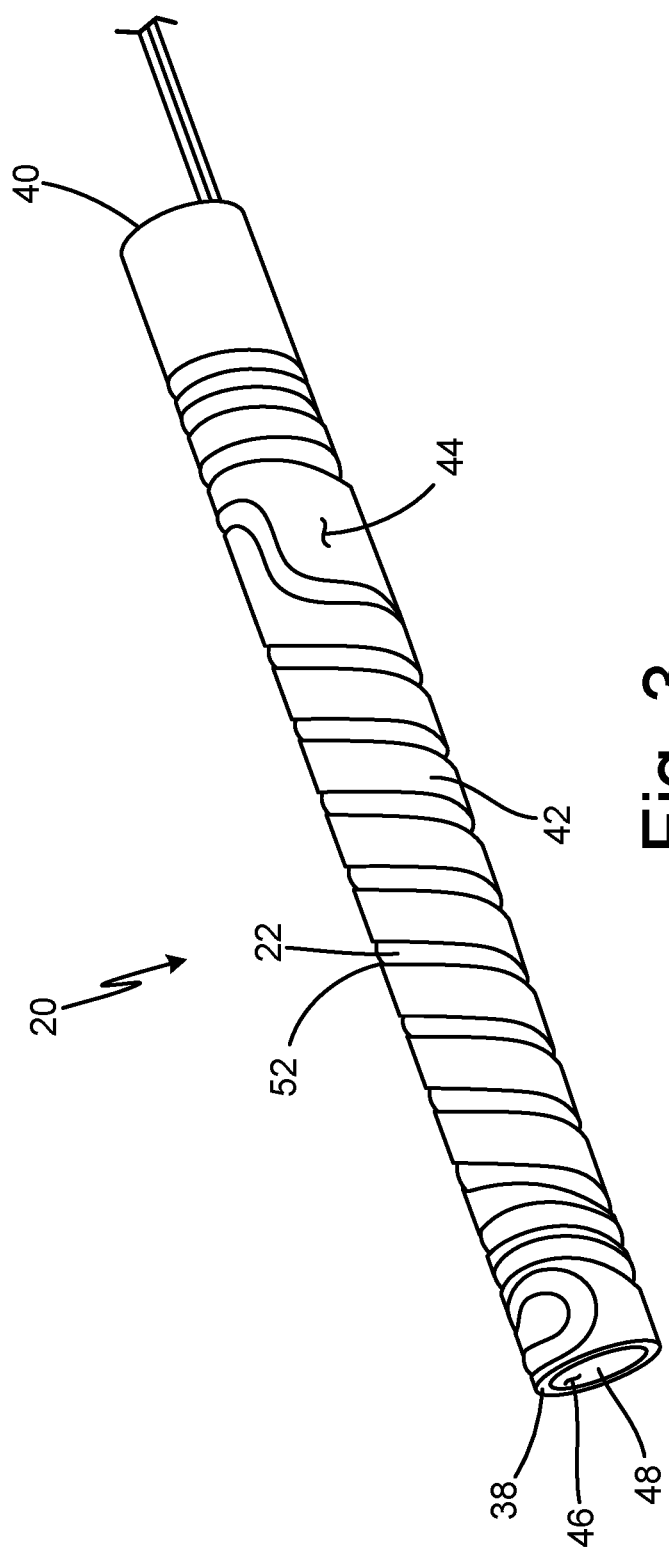
FIG. 3 is a perspective view of a heater wrapped around the insert.
Figure 4A:
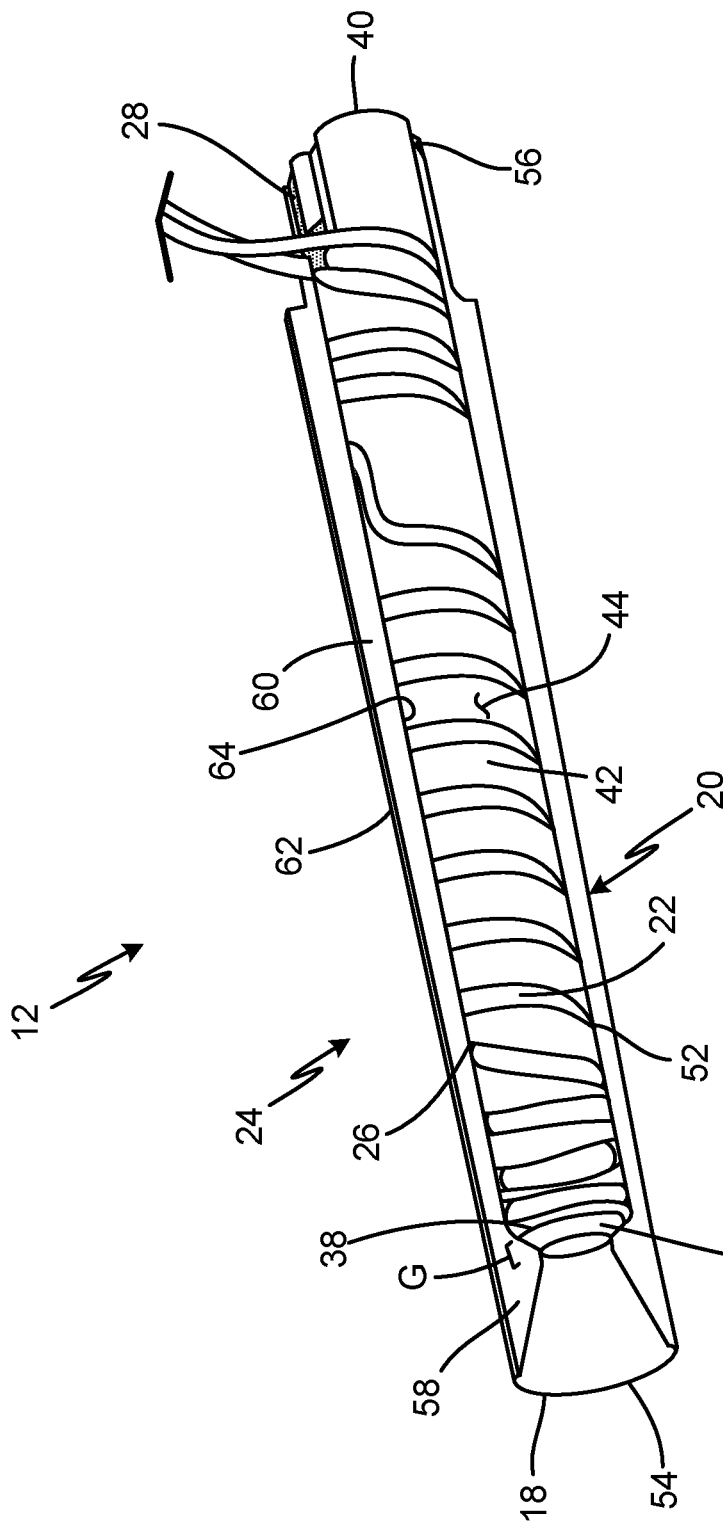
FIG. 4A is a partial cross-sectional view of the insert and the heater inside an outer shell of the probe head including braze and a tip weld and after machining.
Figure 4B:
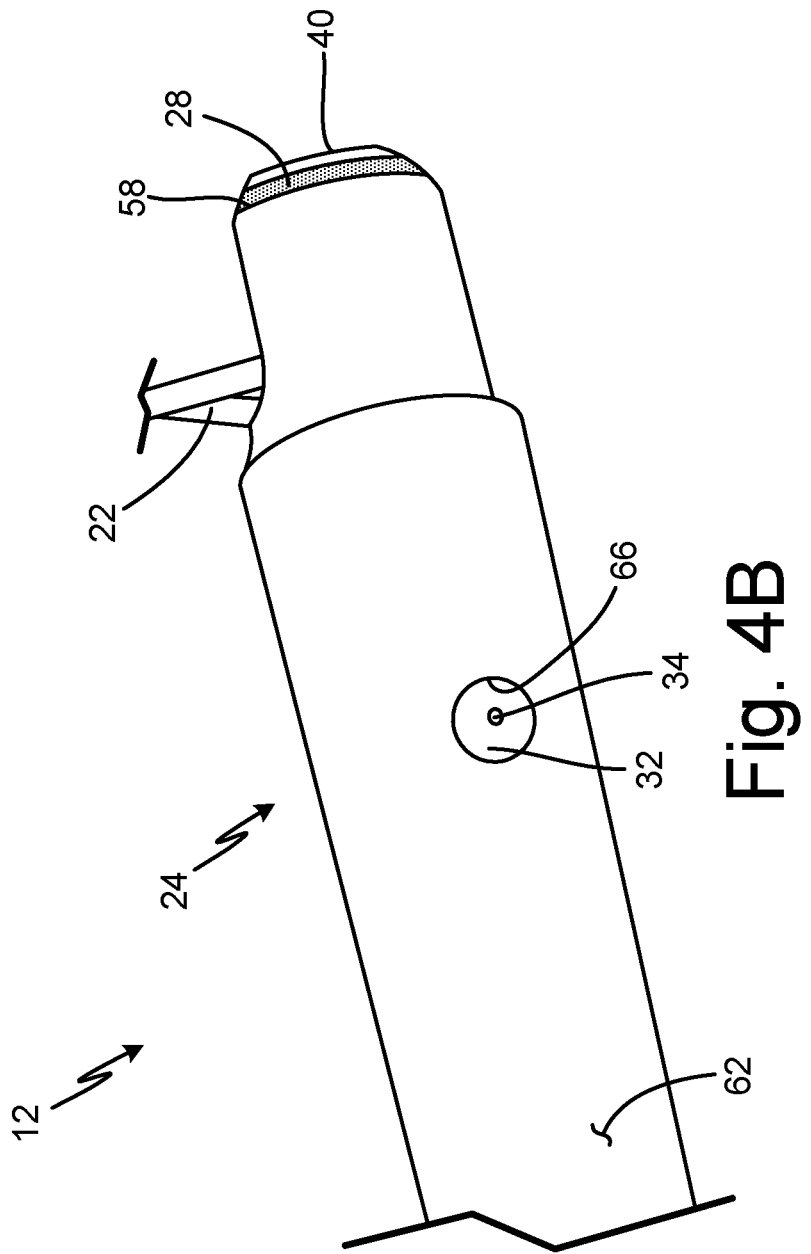
FIG. 4B is a partial view of the insert and the outer shell showing a hole through a weld in the probe head.
Figure 5A:
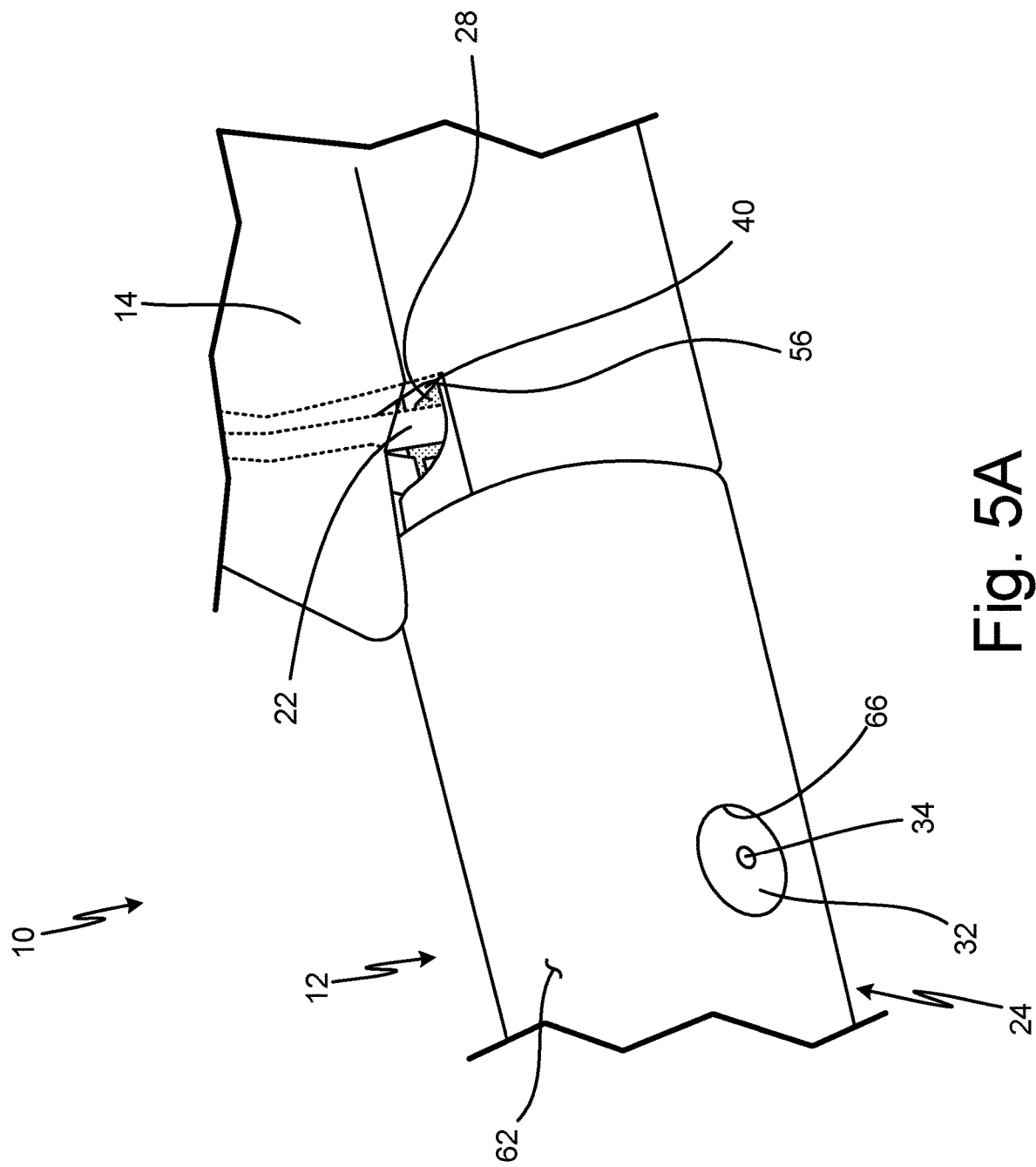
FIG. 5A is a partial perspective view of the probe head assembled to a strut with the heater wrapped around the strut.

FIGS. 2-5B illustrate the method for forming pitot probe 10. FIG. 2 is a perspective view of insert 20 of probe head 12 of air data probe 10. FIG. 3 is a perspective view of heater 22 wrapped around insert 20. FIG. 4A is a partial cross-sectional view of insert 20 and heater 22 inside outer shell 24 of probe head 12 including first braze 26 and second braze 28 and tip weld 30 and after machining. FIG. 4B is a partial view of insert 20 and outer shell 24 showing hole 34 through weld 32 in probe head 12. FIG. 4C is a partial cross-sectional view of hole 34 in probe head 12. FIG. 5A is a partial perspective view of probe head 12 assembled to strut 14 with heater 22 wrapped around strut 14. FIG. 5B is a partial perspective view of probe head 12 assembled to strut 14 and including third braze 36.

Air data probe 10 includes probe head 12 and strut 14. Probe head 12 includes tip 18, insert 20, heater 22, outer shell 24, first braze 26, second braze 28, tip weld 30, hole weld 32, hole 34, and third braze 36. Insert 20 includes first end 38, second end 40, body portion 42, exterior surface 44, interior surface 46, bore 48, water dams 50, and groove 52. Outer shell 24 includes first end 54, second end 56, tip portion 58, body portion 60, exterior surface 62, interior surface 64, and hole 66.

FIG. 2 shows insert 20 with groove 52. Groove 52 extends along body portion 42 of insert 20 such that body portion 42 includes groove 52. Groove 52 extends from body portion 42 adjacent first end 38 to body portion 42 adjacent second end 40. Groove 52 has a depth and width to accept heater 22.

FIG. 3 shows heater 22 wrapped around insert 20. Heater 22 is helically wound into groove 52 in insert 20. Heater 22 can fill the entire length of groove 52. As such, heater 22 extends along a body portion 42 of insert 20.

FIG. 4A shows insert 20 and heater 22 inside outer shell 24. Outer shell 24 is hollow to accept insert 20 and heater 22. Insert 20 with helically wound heater 22 is inserted into second end 56 of outer shell 24. First end 38 of heater 22 is inserted into outer shell 24 until first end 38 is adjacent tip portion 58 of outer shell 24 and body portion 60 of outer shell surrounds body portion 42 of insert 20. As such, outer shell 24 covers exterior surface 44 of insert 20 from first end 38 to exterior surface 44 adjacent second end 40. Second end 40 of insert 20 extends beyond second end 56 of outer shell 24. Tip portion 58 of outer shell 24 has a varied inner diameter that prevents insert 20 from extending into tip portion 58. Gap G is formed between first end 38 of insert 20, which is at an end of body portion 60 of outer shell 24, and a portion of interior surface 64 of outer shell 24 at tip portion 58 of outer shell 24. As such, first end 38 of insert and interior surface 64 of outer shell 24 at tip portion 58 form gap G.

After insert 20 is inserted into outer shell 24, outer shell 24 is vacuum brazed to insert 20 and heater 22, resulting in the formation of a layer of first braze 26. First braze 26 forms a layer between insert 20 with heater 22 and outer shell 24. First braze 26 connects insert 20 and heater 22 to outer shell 24 such that heat from heater 22 is transferred to outer shell 24. First braze 26 extends along exterior surface 44 of body portion 42 of insert 20. After brazing insert 20 with heater 22 to outer shell 24, insert 20 adjacent second end 40 and second end 56 of outer shell 24 are torch brazed externally to form second braze 28. Second braze 28 extends between insert 20 and second end 56 of outer shell 24 to seal probe head 12.

After brazing insert 20 with heater 22 to outer shell 24, probe head 12 is welded internally, such as via additive laser welding, resulting in tip weld 30. Gap G between first end 38 of insert 20 and a portion of interior surface 64 of outer shell 24 at tip portion 58 of outer shell 24 is welded to form tip weld 30. As such, tip weld 30 fills gap G between first end 38 of insert 20 and interior surface 64 of outer shell 24 at tip portion 58 to seal first end 38 of insert 20 and outer shell 24. Thus, tip weld 30 is at first end 38 of insert 20.

Further, FIGS. 4B and 4C show hole weld 32 in probe head 12. Hole 66 in outer shell 24 is welded externally to form hole weld 32. Hole weld 32 fills hole 66 in outer shell 24. Hole 34 is drilled into probe head 12 at hole weld 32. Hole 34 extends from exterior surface 62 of outer shell 24 to interior surface 64 of insert 20. Hole 34 extends through outer shell 24 at hole weld 32. Hole 34 allows bore 48 to be in fluid communication with the external environment. As such, when hole 34 is a drain hole, water within bore 48 of probe head 12 can be knocked down by water dams 50, which extend into bore 48, and drain out of probe head 12 through hole 34. Alternatively, when hole 34 is a sensing port, parameters in addition to pitot pressure can be measured using air data probe 10.

Outer shell 24 is machined to a final contour. Exterior surface 62 of outer shell 24 is machined to be substantially smooth, and the final outer diameter of the outer shell 24 is smaller than the outer diameter prior to machining. Interior surface 64 at tip portion 58 of outer shell 24 may also be machined to achieve a desired cross-sectional area at tip 18 of air data probe 10.

FIGS. 5A and 5B show probe head 12 assembled to strut 14. Second end 40 of insert 20, second braze 28, and second end 56 of outer shell 24 are inserted into the first end of strut 14. As seen in FIG. 5A, heater 22 is further wrapped into a groove within strut 14. Heater 22 is then torch brazed to strut 14. In alternate embodiments, heater 22 may be connected to strut 14 via induction brazing, welding, or using any other suitable process. As seen in FIG. 5B, probe head 12 is brazed to strut 14 such that third braze 36 covers heater 22 between probe head 12 and strut 14, resulting in heater 22 not being visible from an exterior of air data probe 10.

Tip weld 30 is connected to first end 38 of insert 20 and interior surface 64 of outer shell 24, sealing any leak paths at first end 38 of insert 20. Likewise, because insert 20 extends past outer shell 24, insert 20 and second end 56 of outer shell 24 can be brazed externally, sealing any leak paths adjacent second end 40 of insert. As such, heater 22 is hermetically sealed between insert 20 and outer shell 24. Holes 34 are drilled through hole weld 32 so as to avoid leak paths to heater 22. For example, if holes 34 were drilled through outer shell 24, first braze 26, and insert 20, a leak path could be introduced if the section of first braze 26 included a void in the area adjacent the hole.

Machining probe head 12 allows outer shell 24 to be in a more robust configuration during the formation of probe head 12, such as during brazing and welding processes, and still achieve the desired final geometry. Due to holes 34 being drilled through hole weld 32, probe head 12 can have holes to provide fluid communication between bore 38 and the external environment without violating the hermetic seal. Heater 22 is still protected from the external environment and avoids corrosion, even if internal voids are present within first braze 26 along heater 22.

FIG. 6A is a partial perspective view of probe head 12A. FIG. 6B is a partial exploded view of probe head 12A. FIGS. 6A and 6B will be discussed together to describe the components of probe head 12A. Probe head 12A includes tip 18A, insert 20A (shown in FIG. 6B), heater 22A (shown in FIG. 6B), outer shell 24A, first braze 26A (shown in FIG. 6B), second braze 28A (shown in FIG. 6B) tip weld 30A, hole weld 32A, and hole 34A. Insert 20A includes first end 38A (shown in FIG. 6B), second end 40A (shown in FIG. 6B), body portion 42A (shown in FIG. 6B), exterior surface 44A (shown in FIG. 6B), interior surface 46A (shown in FIG. 6B), bore 48A (shown in FIG. 6B), and groove 52A (shown in FIG. 6B). Outer shell 24A includes first end 54A, tip portion 58A, body portion 60A, exterior surface 62A, interior surface 64A (shown in FIG. 6B), and hole 66A.

In this embodiment, probe head 12A is similar in structure and function to probe head 12 described with respect to FIGS. 1A-5B. However, first end 38A of insert 20A extends to first end 54A of outer shell 24A, and tip weld 30A is connected to first end 38A of insert 20A and first end 54A of outer shell 24A to form tip 18A of probe head 12A. Additionally, second end 40A of insert 20A may extend beyond a second end of outer shell 24A, as described in reference to FIGS. 1A-5B, or the second end of outer shell 24A may extend beyond second end 40A of insert 20A such that second braze 28A is within outer shell 24A, as shown in FIGS. 6A-9B.

Outer shell 24A is substantially cylindrical and fully surrounds insert 20A and a portion of heater 22A such that the portion of heater 22A in insert 20A is between insert 20A and outer shell 24A. Tip weld 30A is connected to ends of insert 20A and outer shell 24A and connects insert 20A and outer shell 24A. As such, tip weld 30A seals a gap between the end of insert 20A and the end of outer shell 24A to connect and seal insert 20A and outer shell 24A and form tip 18A of probe head 12A.

First end 38A of insert 20A is connected and hermetically sealed to outer shell 24A via tip weld 30A. Second end 40A of insert 20A is connected and hermetically sealed to outer shell 24A via second braze 28.

Outer shell 24A surrounds insert 20A such that first end 54A of outer shell 24A is substantially aligned with first end 38A of insert 20A. A second end of outer shell 24A extends beyond second end 40A of insert 20A. Tip portion 58A at first end 54A is substantially aligned with first end 38A of insert 20A. Tip portion 58A decreases in cross-sectional area toward first end 54A to match the decreasing cross-sectional area of insert 20A. As such, tip portion 58A and body portion 60A surround insert 20A and the portion of heater 22A within groove 52A. Interior surface 64A forms an inner diameter of outer shell 24A having a decreasing diameter at tip portion 58A and a substantially constant diameter at body portion 60A. Second end 40A of insert 20A is within body portion 60A of outer shell 24A.

First braze 26A extends from first end 38A of insert 20A to second end 40A of insert 20A and along body portion 42A of insert 20A. Tip weld 30A is connected to first end 38A of insert 20A and first end 54A of outer shell 24A. Tip weld 30A fills gap GA between first end 38A of insert 20A and first end 54A of outer shell 24A. Tip weld 30A connects and seals first end 38A of insert 20A and first end 54A of outer shell 24A. Tip weld 30A makes up tip 18A of probe head 12A. Second end 40A of insert 20A and interior surface 64A of outer shell 24A are connected via second braze 28A. As such, second braze 28A is between insert 20A adjacent second end 40A outer shell 24A. A second end of outer shell 24A is connected to a strut (as shown in FIG. 1A) via a third braze. Heater 22A within insert 20A is fully encapsulated and hermetically sealed between insert 20A and outer shell 24A.

Tip weld 30A connected to first end 38A of insert 20A and first end 54A of outer shell 24A seals first end 38A of insert while second braze 28A provides a seal at second end 40A of insert 20A, fully encapsulating and hermetically sealing heater 22A within insert 20A between insert 20A and outer shell 24A.

Because first end 38A of insert 20A is sealed to first end 54A of outer shell 24A, leak paths near first end 38A and first end 54A are sealed, preventing heater 22A from being directly exposed to moisture or other external contaminants, reducing corrosion, and improving heat transfer within probe head 12A. Further, because second end 40A of insert 20A is also sealed to outer shell 24A, an entirety of heater 22A within insert 20A is sealed between insert 20A and outer shell 24A, further protecting heater 22A from the external environment by preventing direct exposure of heater 22A to moisture or other contamination that could induce corrosion.

Figure 8B:
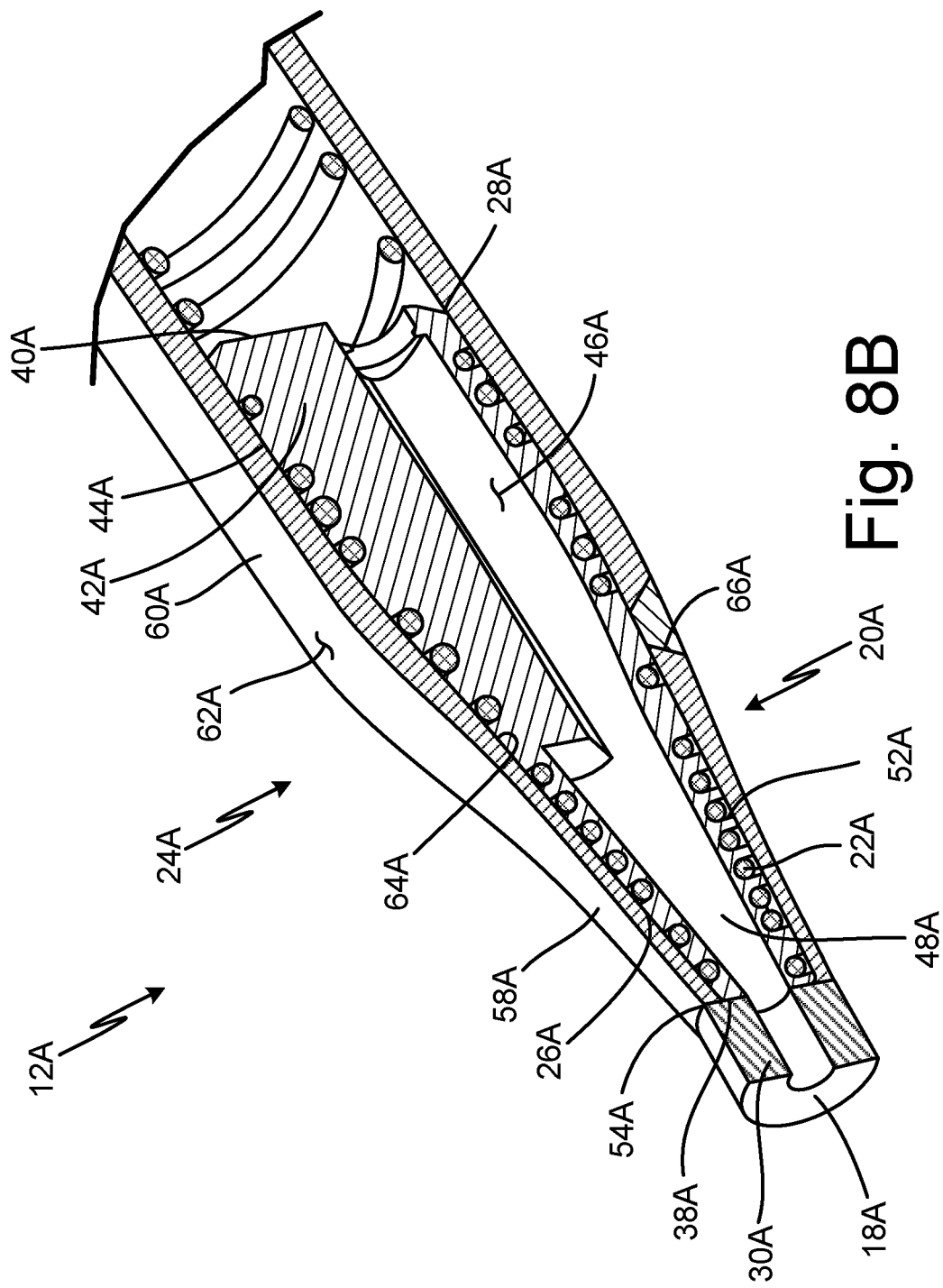
FIG. 8B is a partial perspective view of the insert and the outer shell with a tip weld.
Figure 9B:
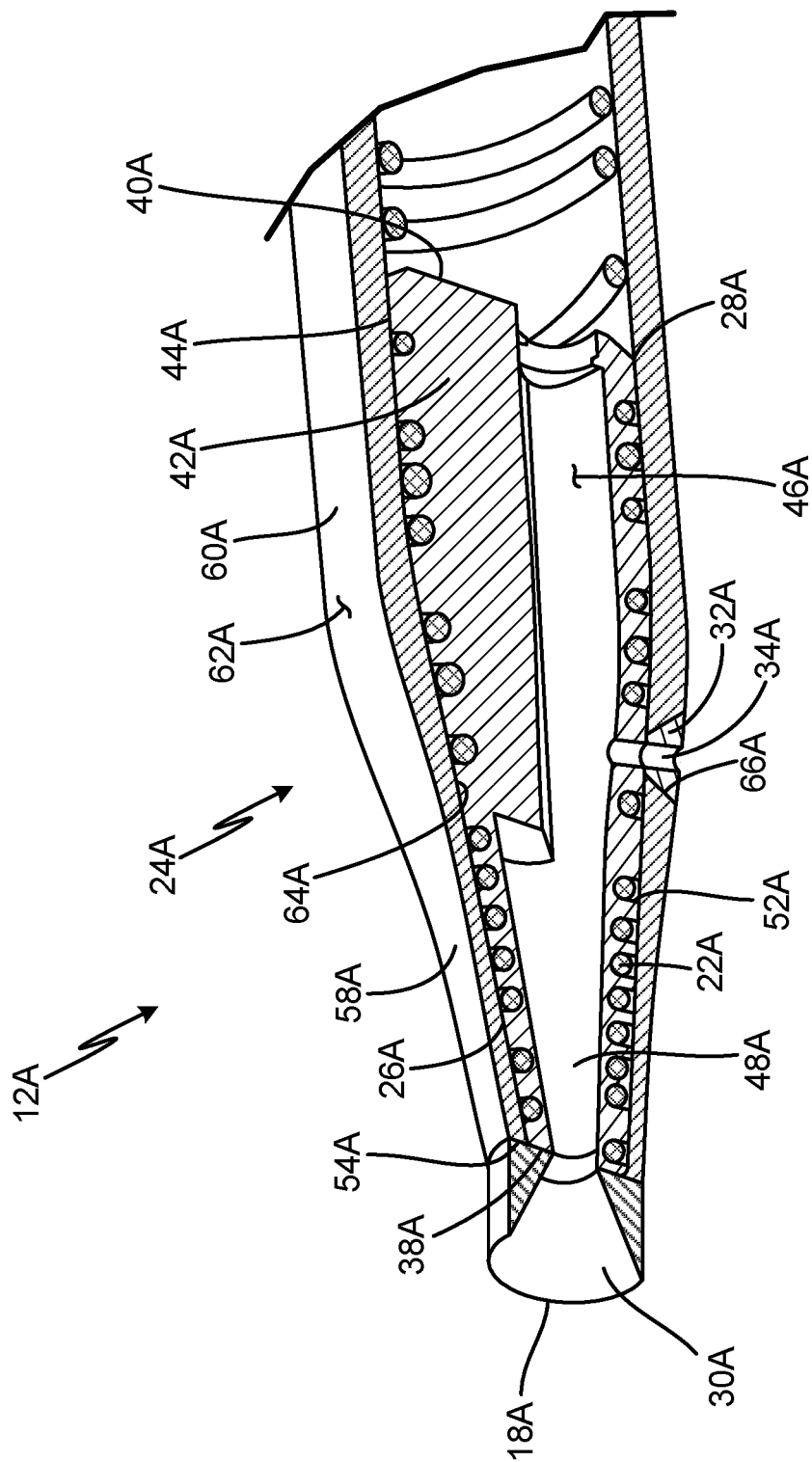
FIG. 9B is a partial cross-sectional view of the probe head after machining.

FIGS. 7A-9B illustrate the method for forming probe head 12A. FIG. 7A is a partial perspective view of insert 20A inside outer shell 24A of probe head 12A. FIG. 7B is a partial cross-sectional view of insert 20A inside outer shell 24A of probe head 12A. FIG. 8A is a partial perspective view of outer shell 24A with tip weld 30A. FIG. 8B is a partial perspective view of insert 20A and outer shell 24A with tip weld 30A. FIG. 9A is a partial perspective view of probe head 12A showing hole 34A through hole weld 32A in probe head 12A and after machining. FIG. 9B is a partial cross-sectional view of probe head 12A after machining.

Probe head 12A includes tip 18A, insert 20A, heater 22A, outer shell 24A, first braze 26A, second braze 28A, tip weld 30A, hole weld 32A, and hole 34A. Insert 20A includes first end 38A, second end 40A, body portion 42A, exterior surface 44A, interior surface 46A, bore 48A, and groove 52A. Outer shell 24A includes first end 54A, tip portion 58A, body portion 60A, exterior surface 62A, interior surface 64A, and hole 66A.

The method for forming probe head 12A is similar to the method for forming probe head 12 described with respect to FIGS. 1A-5B. However, as stated with respect to FIGS. 6A and 6B, first end 38A of insert 20A extends to first end 54A of outer shell 24A such that gap GA is between first end 54A of outer shell 24A and first end 38A of insert 20A. As such, tip weld 30A is formed at first end 38A of insert 20A and first end 54A of outer shell 24A to form tip 18A of probe head 12A. Additionally, as stated with respect to FIGS. 6A and 6B, second end 40A of insert 20A may extend beyond second end 56A of outer shell 24A, as described in reference to FIGS. 1A-5B, or second end 56A of outer shell 24A may extend beyond second end 40A of insert 20A such that second braze 28A is within outer shell 24A, as shown in FIGS. 6A-9B.

FIGS. 7A and 7B show insert 20A with a portion of heater 22A inside outer shell 24A. First end 38A of heater 22A is inserted into outer shell 24A until first end 38A is substantially aligned with first end 54A of outer shell 24A. As such, outer shell 24A covers exterior surface 44A of insert 20A from first end 38A to second end 40A, and insert 20A extends through an entirety of tip portion 58A. Gap GA is formed between first end 54A of outer shell 24A and first end 38A of insert 20A.

After vacuum brazing insert 20A with heater 22A to outer shell 24A, second end 40A of insert 20A is brazed to interior surface 64A of outer shell 24A internally to form second braze 28A. Second braze 28A extends between insert 20A and interior surface 64A of outer shell 24A to seal probe head 12A.

After brazing insert 20A with heater 22A to outer shell 24A, probe head 12A is welded externally via additive manufacturing or additive laser welding, such as powder bed fusion or laser sintering, or any other suitable welding method, resulting in tip weld 30A and forming tip 18A of probe head 12A, as seen in FIGS. 8A and 8B. Gap GA between first end 38A of insert 20A and first end 54A of outer shell 24 at tip portion 58A of outer shell 24A is welded to form tip weld 30A. As such, tip weld 30A fills gap GA between first end 38 of insert 20 and first end 54A of outer shell 24 to seal first end 38A of insert 20A and first end 54A of outer shell 24A. Thus, tip weld 30A forms tip 18A of probe head 12A. Tip weld 30A has a central hole that aligns with bore 48A of insert 20A.

Further, FIGS. 9A and 9B show hole weld 32A in probe head 12A. Hole weld 32A is a side port, such as an alpha or static port, in probe head 12A. As seen in FIGS. 9A and 9B, outer shell 24 is machined to a final contour. Exterior surface 62A of outer shell 24A and tip weld 30A are machined to be substantially smooth. The final outer diameter of the outer shell 24A is smaller than the outer diameter prior to machining, and the final inner diameter of tip weld 30A is larger than the inner diameter prior to machining. An interior surface of tip weld 30A may be machined to achieve a desired cross-sectional area or contour at tip 18A of probe head 12A, such as having a decreasing inner diameter, as shown in FIGS. 9A and 9B. Second end 56A of outer shell 24A may be inserted into the first end of a strut, as described with respect to FIGS. 1A-5B.

Tip weld 30A is connected to first end 38A of insert 20A and first end 54A of outer shell 24A, sealing any leak paths between first end 38A of insert 20A and first end of outer shell 24A Likewise, because second end 40A of insert 20A is sealed to outer shell 24A, any leak paths between insert 20A and outer shell 24A are sealed. As such, heater 22A is hermetically sealed between insert 20A and outer shell 24A. Holes 34A are drilled through hole weld 32A so as to avoid leak paths to heater 22A.

Machining probe head 12A allows outer shell 24A and tip weld 30A to be in a more robust configuration during the formation of probe head 12A, such as during brazing and welding processes, and still achieve the desired final geometry. Tip weld 30A is formed externally, simplifying creation and inspection of tip weld 30A. Due to holes 34A being drilled through hole weld 32A, probe head 12A can have holes to provide fluid communication between bore 38A and the external environment without violating the hermetic seal.

Discussion of Possible Embodiments

The following are non-exclusive descriptions of possible embodiments of the present invention.

A probe head of an air data probe includes an insert including: a first end; a second end opposite the first end; and a body portion extending between the first end and the second end, the body portion including a groove; a portion of a heater within the groove; an outer shell surrounding the insert and the portion of the heater, the outer shell including: a tip portion defining a first end of the outer shell; and a body portion extending from the tip portion defining a second end of the outer shell; a tip weld between the outer shell and the first end of the insert; a braze between the insert and the second end of the outer shell adjacent a second end of the insert; wherein the portion of the heater is hermetically sealed between the insert and the outer shell.

The probe head of the preceding paragraph can optionally include, additionally and/or alternatively, any one or more of the following features, configurations and/or additional components:

The body portion of the outer shell surrounds the insert and the portion of the heater.

The tip portion of the outer shell makes up the tip of the probe head.

The tip weld is between an interior surface of the outer shell and the first end of the insert.

The tip weld is between the interior surface of the outer shell at an end of the tip portion of the outer shell and the first end of the insert.

The tip weld is between the interior surface of the outer shell at an end of the tip portion of the outer shell adjacent the body portion of the outer shell.

The tip portion of the outer shell extends beyond the first end of the insert.

A probe head of an air data probe includes an insert including: a first end; a second end opposite the first end; and a body portion extending between the first end and the second end, the body portion including a groove; a portion of a heater within the groove; an outer shell surrounding the insert and the portion of the heater, the outer shell including: a tip portion defining a first end of the outer shell; and a body portion extending from the tip portion; and a tip weld connected to the first end of the insert and the first end of the outer shell.

The probe head of the preceding paragraph can optionally include, additionally and/or alternatively, any one or more of the following features, configurations and/or additional components:

The first end of the insert and the first end of the outer shell are sealed by the tip weld.

The tip weld forms the tip of the probe head.

The first end of the insert is substantially aligned with the first end of the outer shell.

A second end of the insert is within the body portion of the outer shell.

The tip portion of the outer shell decreases in diameter.

A method of forming a probe head, the method comprising: inserting an insert with a portion of a heater into an outer shell of the probe head; brazing the outer shell to the insert and the portion of the heater; welding a gap between the outer shell and a first end of the insert, the first end of the insert opposite the second end of the insert, the second end being configured to be attached to a strut; brazing an end of the outer shell to the insert adjacent a second end of the insert; and sealing the first end of the insert to the outer shell.

The method of the preceding paragraph can optionally include, additionally and/or alternatively, any one or more of the following features, configurations and/or additional components:

The gap is welded internally.

The end of the outer shell and the insert are brazed externally.

Forming a hole through the outer shell and the insert therethrough providing fluid communication from a bore defined within the insert to an outside of the outer shell without violating the hermetic seal.

Welding a hole in the outer shell to form a hole weld that fills the hole and extends from an exterior surface of the outer shell to an exterior surface of the insert.

The gap is between an interior surface of the outer shell at a tip portion of the outer shell and the first end of the insert.

The gap is between an end of the outer shell and the first end of the insert, such that welding the gap forms a tip weld that makes up the tip of the probe head and wherein the tip weld is formed via additive manufacturing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe head of an air data probe comprising:
   an insert including:
      a first end;
      a second end opposite the first end; and
      a body portion extending between the first end and the second end, the body portion including a groove;
   a portion of a heater within the groove;
   an outer shell surrounding the insert and the portion of the heater, the outer shell including:
      a tip portion defining a first end of the outer shell, wherein the tip portion of the outer shell makes up a tip of the probe head; and
      a body portion extending from the tip portion defining a second end of the outer shell;
   a tip weld between the outer shell and the first end of the insert, wherein the tip weld is between an interior surface of the outer shell and the first end of the insert;
   a braze between the insert and the second end of the outer shell adjacent a second end of the insert;
   wherein the portion of the heater is hermetically sealed between the insert and the outer shell.

2. The probe head of claim 1 wherein the body portion of the outer shell surrounds the insert and the portion of the heater.

3. The probe head of claim 1, wherein the tip weld is between the interior surface of the outer shell at an end of the tip portion of the outer shell and the first end of the insert.

4. The probe head of claim 3, wherein the tip weld is between the interior surface of the outer shell at an end of the tip portion of the outer shell adjacent the body portion of the outer shell.

5. The probe head of claim 1, wherein the tip portion of the outer shell extends beyond the first end of the insert.

6. A probe head of an air data probe comprising:
   an insert including:
      a first end;
      a second end opposite the first end; and
      a body portion extending between the first end and the second end, the body portion including a groove;
   a portion of a heater within the groove;
   an outer shell surrounding the insert and the portion of the heater, the outer shell including:
      a tip portion defining a first end of the outer shell; and
      a body portion extending from the tip portion; and
   a tip weld connected to the first end of the insert and the first end of the outer shell, wherein the tip weld forms the tip of the probe head.

7. The probe head of claim 6, wherein the first end of the insert and the first end of the outer shell are sealed by the tip weld.

8. The probe head of claim 6, wherein the first end of the insert is substantially aligned with the first end of the outer shell.

9. The probe head of claim 6, wherein a second end of the insert is within the body portion of the outer shell.

10. The probe head of claim 6, wherein the tip portion of the outer shell decreases in diameter.

11. A method of forming a probe head, the method comprising:
    inserting an insert with a portion of a heater into an outer shell of the probe head, the outer shell having a tip portion that makes up a tip of the probe head;
    brazing the outer shell to the insert and the portion of the heater;
    welding a gap between the outer shell and a first end of the insert such that a tip weld is between an interior surface of the outer shell and the first end of the insert, the first end of the insert being opposite the second end of the insert, the second end being configured to be attached to a strut;
    brazing an end of the outer shell to the insert adjacent a second end of the insert; and
    sealing the first end of the insert to the outer shell.

12. The method of claim 11, wherein the gap is welded internally.

13. The method of claim 11, wherein the end of the outer shell and the insert are brazed externally.

14. A method of forming a probe head, the method comprising:
    inserting an insert with a portion of a heater into an outer shell of the probe head;
    brazing the outer shell to the insert and the portion of the heater;
    welding a gap between the outer shell and a first end of the insert, the first end of the insert being opposite the second end of the insert, the second end being configured to be attached to a strut;
    brazing an end of the outer shell to the insert adjacent a second end of the insert; and
    sealing the first end of the insert to the outer shell; and
    forming a hole through the outer shell and the insert therethrough providing fluid communication from a bore defined within the insert to an outside of the outer shell without violating the hermetic seal.

15. A method of forming a probe head, the method comprising:
    inserting an insert with a portion of a heater into an outer shell of the probe head;
    brazing the outer shell to the insert and the portion of the heater;
    welding a gap between the outer shell and a first end of the insert, the first end of the insert being opposite the second end of the insert, the second end being configured to be attached to a strut;
    brazing an end of the outer shell to the insert adjacent a second end of the insert; and
    sealing the first end of the insert to the outer shell;

welding a hole in the outer shell to form a hole weld that fills the hole and extends from an exterior surface of the outer shell to an exterior surface of the insert.

16. The method of claim 11, wherein the gap is between an interior surface of the outer shell at a tip portion of the outer shell and the first end of the insert.

* * * * *